US011233644B2

(12) United States Patent
Kreder, III et al.

(10) Patent No.: US 11,233,644 B2
(45) Date of Patent: Jan. 25, 2022

(54) SYSTEM FOR SECURE STORAGE OF CRYPTOGRAPHIC KEYS

(71) Applicant: GRIDPLUS INC., Austin, TX (US)

(72) Inventors: Karl J. Kreder, III, Austin, TX (US); Alexander Scot Miller, Austin, TX (US); Mark Vincent D'Agostino, Austin, TX (US); John R. Boyd, IV, Austin, TX (US)

(73) Assignee: GRIDPLUS INC., Austin, TX (US)

( * ) Notice: Subject to any disclaimer, the term of this patent is extended or adjusted under 35 U.S.C. 154(b) by 232 days.

(21) Appl. No.: 16/057,290

(22) Filed: Aug. 7, 2018

(65) Prior Publication Data

US 2019/0052461 A1 Feb. 14, 2019

Related U.S. Application Data

(60) Provisional application No. 62/543,369, filed on Aug. 9, 2017.

(51) Int. Cl.
*H04L 9/08* (2006.01)
*H04L 9/32* (2006.01)
(Continued)

(52) U.S. Cl.
CPC ............ *H04L 9/0897* (2013.01); *G06F 21/64* (2013.01); *G06F 21/75* (2013.01); *G06F 21/78* (2013.01);
(Continued)

(58) Field of Classification Search
None
See application file for complete search history.

(56) References Cited

U.S. PATENT DOCUMENTS 7,051,212 B2 * 5/2006 Ginter .................. H04L 9/0819
713/193
2011/0307703 A1 12/2011 Ogg et al.
(Continued)

FOREIGN PATENT DOCUMENTS

WO 2016120826 A2 8/2016
WO 2017122187 A2 7/2017

OTHER PUBLICATIONS

Wittmann-Regis, Agnes, "Patent Cooperation Treaty International Search Report and Written Opinion dated Feb. 20, 2020", Patent Cooperation Treaty Application No. PCT/US2018/045737, Patent Cooperation Treaty, Feb. 20, 2020.
(Continued)

*Primary Examiner* — Arezoo Sherkat
(74) *Attorney, Agent, or Firm* — Lindauer Law, PLLC

(57) ABSTRACT

A secure device comprises a secure computing environment (SCE) that stores one or more cryptographic secrets, such as private keys, and is able to receive input from secure input devices such as a keypad or smartcard interface and provide output to secure output devices such as a secure display. The SCE provides safeguards against remote and physical exploits, erasing or rendering unusable the secrets in the event of actual or suspected exploit, protecting the secrets from compromise. The SCE may digitally sign internally generated messages or messages from an external device such as a smartphone. Message signing conditions may be checked and satisfied in the SCE before a digitally signed message is generated. Messages may be automatically signed if they satisfy specified conditions. The secure device may be used as part of a multisignature scheme in which a plurality of private keys are used to create a digital signature.

20 Claims, 10 Drawing Sheets

(51) Int. Cl.
  *G06F 21/64* (2013.01)
  *G06Q 20/38* (2012.01)
  *G06Q 20/34* (2012.01)
  *G06Q 20/06* (2012.01)
  *G06F 21/75* (2013.01)
  *G06F 21/78* (2013.01)

(52) U.S. Cl.
  CPC ......... *G06Q 20/065* (2013.01); *G06Q 20/341* (2013.01); *G06Q 20/3829* (2013.01); *H04L 9/085* (2013.01); *H04L 9/0819* (2013.01); *H04L 9/3234* (2013.01); *H04L 9/3239* (2013.01); *H04L 9/3247* (2013.01); *H04L 9/3255* (2013.01); *H04L 9/3278* (2013.01); *G06F 2221/2143* (2013.01); *G06Q 2220/00* (2013.01); *H04L 2209/38* (2013.01)

(56) References Cited

U.S. PATENT DOCUMENTS

| | | | | |
|---|---|---|---|---|
| 2014/0258736 | A1* | 9/2014 | Merchan | G06F 21/62 |
| | | | | 713/193 |
| 2016/0149710 | A1* | 5/2016 | Huxham | H04W 12/0608 |
| | | | | 713/175 |
| 2016/0275461 | A1 | 9/2016 | Sprague et al. | |
| 2016/0306953 | A1 | 10/2016 | Cambou | |
| 2017/0221288 | A1 | 8/2017 | Johnson et al. | |
| 2018/0041345 | A1* | 2/2018 | Maim | H04L 9/32 |
| 2018/0254898 | A1* | 9/2018 | Sprague | H04L 9/0637 |
| 2019/0013943 | A1* | 1/2019 | Maim | G06F 21/51 |
| 2019/0268332 | A1* | 8/2019 | Wang | G06F 21/44 |
| 2019/0280864 | A1* | 9/2019 | Cheng | H04L 9/0894 |
| 2019/0394025 | A1* | 12/2019 | Maim | G06F 21/57 |
| 2020/0021446 | A1* | 1/2020 | Roennow | H04L 63/0478 |
| 2020/0036519 | A1* | 1/2020 | Bitauld | H04L 9/3263 |
| 2020/0099518 | A1* | 3/2020 | Jacobs | G06Q 20/12 |
| 2020/0387893 | A1* | 12/2020 | Maim | G06F 21/51 |

OTHER PUBLICATIONS

Young, Lee W., "Patent Cooperation Treaty International Search Report and Written Opinion dated Dec. 6, 2018," Patent Cooperation Treaty Application No. PCT/US18/45737, Patent Cooperation Treaty, Dec. 6, 2018.

"Filament Security Overview Networking Devices at the Edge of Risk", Apr. 1, 2017, 12 pages. Retrieved from the Internet: URL:https://filamet.com/assets/downloads/Filament%20Security.pdf.

Karst, Jan Johan, et al., "Connecting Multiple Devices with Blockchain in the Internet of Things", Jan. 5, 2017, 23 pages. Retrieved from the internet: URL:https://courses.cs.ut.ee/MTAT.03.323/2016_fall/uploads/Main/002.pdf.

Lind, Joshua, et al., "Teechan: Payment Channels Using Trusted Execution Environments", ARXIV.org, Cornell University Library, Ithaca, NY, Dec. 22, 2016, 15 pages.

Murgan, Tudor, A., "Extended European Search Report dated Mar. 3, 2021", European Patent Office Application No. 18844824.5, European Patent Office, Mar. 10, 2021.

* cited by examiner

500

| MESSAGE DATA 126 ||
|---|---|
| MESSAGE FIELD 502 | MESSAGE VALUE 504 |
| SOURCE ID 502(1) | PHONE9484 |
| DESTINATION ADDRESS 502(2) | 98AFHFL3JNGADLK |
| TRANSACTION TYPE 502(3) | TRANSFER TO |
| TRANSACTION AMOUNT 502(4) | 35 |
| CURRENCY TYPE 502(5) | ETH |
| TIMESTAMP 502(6) | 201807211832001923 |

| CONTACT DATA 274 ||
|---|---|
| CONTACT FIELD 506 | CONTACT VALUE 508 |
| CONTACT ID 506(1) | 0001 |
| USER ID 506(2) | 9038411 |
| NAME 506(3) | GEORGE JONES |
| DIGITAL SIGNATURE 506(4) | 9D32JKAHFE1290839DA1232... |
| IMAGE DATA 506(5) | 3994139.PNG |
| TELEPHONE NUMBER 506(6) | 5555551234 |
| NETWORK ADDRESS 506(7) | 2001:4860:4860::8888 |
| DESTINATION ADDRESS 506(8) | 98AFHFL3JNGADLK |

| PAIRING DATA 268 ||
|---|---|
| PAIRING FIELD 510 | PAIRING VALUE 512 |
| PAIRING ID 510(1) | 884657 |
| PAIR NAME 510(2) | SEND GEORGE MONEY |
| EXPIRATION 510(3) | 20200721120000 |
| PAIR KEY 510(4) | 8984129099AD3A1232... |
| CONTACT ID 510(5) | 0001 |

| CONDITION DATA 270 ||
|---|---|
| CONDITION FIELD 514 | BOUNDARY VALUE(S) 272 |
| PAIRING ID 514(1) | 884657 |
| ALLOWED CURRENCY 514(2) | ETH |
| MAX AMT PER TRANSFER 514(3) | 10 TH |
| MAX TRANSFER FREQUENCY 514(4) | 1 TRANSFER EVERY 24 HOURS |
| MAX AMOUNT PER TIME 514(5) | 80 ETH MAX EVERY 48 HOURS |
| REQUIRE APPROVAL? 514(6) | NO |
| DESTINATION ADDRESS 514(7) | DLK9304GKD2389 |

CONDITIONS 516

| SIGNED MESSAGE DATA 128 ||
|---|---|
| MESSAGE DATA 126 ||
| DIGITAL SIGNATURE 518 | FA93AJ20938ADAGH102984... |

FIG. 5

SYSTEM FOR SECURE STORAGE OF CRYPTOGRAPHIC KEYS

PRIORITY

This application claims priority to U.S. Provisional Patent Application Ser. No. 62/543,369 filed on 9 Aug. 2017, titled "Grid+", the entirety of the contents of which are hereby incorporated by reference into the present disclosure.

BACKGROUND

An increasing number of systems rely on cryptographic secrets, such as private keys, for operation. For example, these systems may be used to securely store data, identify a particular individual or item, exchange value, and so forth.

BRIEF DESCRIPTION OF THE DRAWINGS

FIG. 5 a block diagram of data associated with operation of the secure device, according to one implementation.

Figure 1:
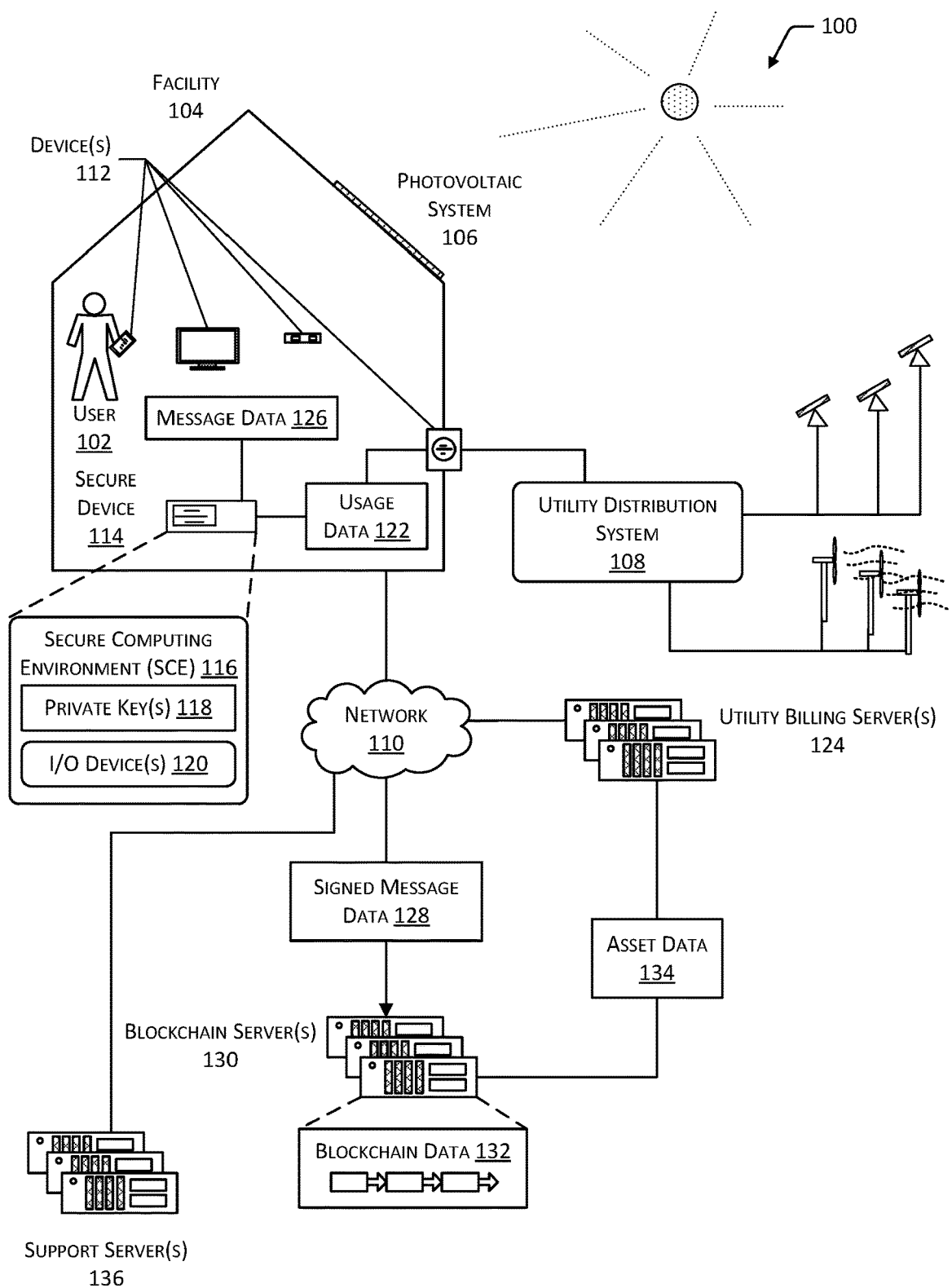
FIG. 1 depicts a system that utilizes a secure device to provide cryptographic functions including, but not limited to, message signing, according to one implementation.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Cryptography and cryptographically based systems are critical to a wide variety of systems. For example, cryptography may be used to prevent disclosure of information to unintended parties, to provide digital signatures that assert the authenticity of a message, and so forth.

Systems such as distributed ledgers (or "blockchains") may utilize digital signatures to sign messages that, if validly signed, would result in updates to the distributed ledger that indicate transfers of tokens from one account to another. At any given time, a token is only associated with one cryptographic key pair. In some implementations, tokens may be used to represent assets. Blockchains provide for a decentralized, distributed trustless system, allowing participants to transfer value, participate in smart contracts, and so forth. For example, crytpocurrencies such as Bitcoin, Ethereum, Iota, Zcash, Monero, Cardano, and so forth utilize blockchains to operate. Digital cryptographic signatures (signatures) are used to determine if a message describing a proposed transaction is authentic, and whether the transaction is valid. A message is deemed to be authentic if the corresponding signature was produced using a specific private key. A transaction is deemed to be valid if the key pair is associated with sufficient balance as indicated in the global ledger or privilege as indicated in the global ledger to execute the transaction on the global ledger. For example, a message describing a transaction may be digitally signed with a private key using a cryptographic function. The private key is intended to remain known only by the party authorized to permit the transaction. Continuing the example, a message describing a transaction to transfer a specific amount of cryptocurrency from a source address that is derived from the signer's private key to a destination address may be digitally signed by the holder of the source private key. The message is then sent to one or more blockchain servers. A blockchain server receives the message and checks the digital signature. If the digital signature is authentic and valid, the blockchain server may proceed to process the message and commit the data in the message into the data of the blockchain. In some situations, the particular blockchain system may perform various checks prior to committing the data, such as waiting until a consensus among other blockchain servers has been reached. These checks establish a shared set of conditions (such as ensuring sufficient balance of the cryptocurrency sender) and are outside the scope of the signature itself.

A cryptographic system is generally deemed to be secure only so long as the secrets that are used as inputs to the cryptographic functions are maintained in secret. For example, Allen may use a private key value known only to him to produce signatures for his cryptocurrency. If Aliens' private key value (which is usually a very large, random number) is ever compromised, such as through physical or electronic theft, carelessness, and so forth, an adversary could then use that private key value to generate authentic digital signatures. If this key were associated with cryptocurrency balances on one or more networks, signing transactions to move those cryptocurrencies would be both authentic and valid. As a result, the adversary could perform actions as if they were Allen, including stealing the cryptocurrencies associated with his private key.

The resistance of a cryptographic system to attack is also proportionate to the size of the private key used. As a result, longer private keys are preferred. The private keys may also be random values. The length, random nature, and so forth may make it difficult or impossible for a user to remember a single private key. The situation becomes untenable when a user may have many private keys. For example, Allen may have a private key for his personal Bitcoin account, a private key for his personal Ethereum account, a private key for his business Ethereum account, and so forth.

Traditional systems have attempted to mitigate these problems by keeping the private key data offline. Physical media such as paper or devices that are "air gapped" and do not remain connected to a network may be used. For example, a cryptocurrency user may print the private key on paper and place it in a bank vault, or store the private key on a removable memory device. However, the paper can be stolen or destroyed. Removable memory devices such as "flash drives" may fail, be damaged, be lost, or get stolen. However, by rendering the private keys inaccessible to a network, they become significantly harder to use. Additionally, physical theft still remains a possibility, as does physical loss due to fire, flood, or other disaster may result in loss of private keys stored using these methods. Such systems also impose significant physical limitations. For example, the amount of private key data that can be printed on a sheet of paper is limited, as is the memory of a single device.

Described in this disclosure is a secure device and systems that allow for highly secure storage and use of secrets such as private keys. A secure device may be placed at a facility, such as a user's home, and may remain connected to a network. The secure device includes a general computing environment (GCE) and separate secure computing environment (SCE).

The GCE includes a processor, memory, and a network interface. The SCE includes a dedicated processor, secure encrypted memory, input devices, output devices, and anti-tamper detection devices or countermeasures.

The secure device may include, or have an interface allowing connection to, one or more smart cards. The smart card may include secure encrypted memory, a processor, antitamper devices, and so forth. Secrets such as one or more private keys may be stored in the secure encrypted memory.

The SCE utilizes a secure operating system (OS) and implements controls over transfer of data to the GCE. In addition to being separate from the GCE, the SCE may respond to attempts to compromise the system by erasing the contents in the secure encrypted memory. For example, an unauthorized communication with the SCE may result in the contents of the secure encrypted memory being erased. In another example, an attempt to physically tamper with the SCE may be determined by one or more tamper detection devices. Upon determining the physical tamper attempt, the SCE may erase the contents of the secure encrypted memory, self-destruct, or take other actions.

The secure device allows for secrets such as private keys to be stored within the SCE as well as on smart cards that may be removed to another physical location. The smart cards allow the user to store different private keys, or portions of a single private key, on different smart cards and physically distribute those smart cards as they see fit, such as to different physical locations. The use of removable smart cards also allows the secure device to access more data than would be feasible to store in a single device. The smart cards also allow the user to safely store keys offline in a way that is physically unreadable.

Data and capabilities of the smart cards may be accessed while the smart card is operating as part of the SCE. For example, the secure device may connect to a smart card. Once connected, the SCE may utilize the private key that is stored in the secure encrypted memory of the smart card, utilize cryptographic functions on the card, and so forth.

In addition to providing a secure environment for one or more smart cards to be accessed, the SCE provides one or more secure input/output (I/O) devices. For example, the SCE may include a touchscreen that incorporates a display and a touch sensor, allowing for the presentation of data to a user and acquiring input from the user. In some implementations the input device may acquire biometric data, including but not limited to fingerprint data, palmprint data, iris data, and so forth. The I/O devices allow the SCE to accept input such as pairing codes, passcodes, biometric data, address data, or other data in a way that is deemed highly secure and is independent of the network that the GCE is connected to. For example, the input provided via the secure input devices may be used for second factor verification.

The SCE may be used to accept as input, or generate internally, a message that is then signed using one or more of the private keys in the secure encrypted memory to produce signed message data. The signing operation may be dependent on values in the message satisfying one or more previously specified conditions. For example, the SCE may implement rules that limit signing based on the identity of the party requesting the signature, type of cryptocurrency, an amount of transfer, frequency of transfer, destination address, and so forth. Continuing the example, the SCE may permit signing of a request for an amount of Ethereum that is below a threshold value, there haven't been other transfers in the last 24 hours, and the destination address in the request matches an address that was previously stored in the SCE. In this example, the message satisfies the conditions, and so the SCE proceeds to sign the message and create the signed message data.

The rules may require that the user approve the signing using the I/O devices on the SCE. For example, if the amount of the proposed transfer exceeds the threshold value, a user interface may be presented on the touchscreen of the SCE and request the user enter a passcode or otherwise approve the signing. Once approved, the message may be signed, and the signed message data may be sent from the SCE to the GCE. The GCE may then send the signed message data to one or more blockchain servers or other external devices. The external devices may then process the signed message data.

The secure device may further improve security by providing contact data via the output device, allowing the user to more easily confirm who the beneficiary of a signed message is. For example, the secure device may store a picture of George and his Ethereum cryptocurrency address. When message data is received requesting a transfer to George's Ethereum address, George's name and picture may be presented, along with a confirmation prompt. This significantly improves the reliability and usability of the system. For example, this simplified interface may prevent incorrectly transferring currency to an incorrect party.

Other devices or systems may be paired with the secure device, providing enhanced functionality. Pairing indicates an established and trusted relationship between the secure device and the other device or system. During pairing, some data may be transferred over the network, such as received at the SCE via the GCE. For example, the secure device and the other device may exchange public keys.

The certainty of the pairing may be further improved by requiring the transfer of out-of-band (OOB) data to complete the pairing. For example, the user may use the I/O device of the SCE to enter a first authorization code that has been provided by the other device. The I/O device of the SCE may also present to the user a second authorization code, that may then be provided via OOB communication to the other device. For example, while setting up a pairing with "Utility Company, Inc.", the user may communicate via telephone call with a representative of "Utility Company, Inc." to receive the first authorization code and give the second authorization code. Upon entry of valid authorization codes, the pairing may be complete.

The pairing functionality allows the secure device to provide signing capabilities to devices that are less secure. For example, the user may pair their smartphone with their secure device. Once paired, the smartphone may be used to generate message data that is sent to the secure device. The message data is passed to the SCE, where the values in the message are checked to determine if they satisfy previously specified conditions. This checking may include determining that the message data is associated with a valid pairing, is within the boundaries specified by the conditions, and so forth. In some situations, the user may be prompted to authorize the signing using the I/O devices of the SCE, further enhancing security. Once approved, either automatically by satisfying the conditions, or after approval that has been manually entered, the SCE may generate the signed message data, which is then provided to an external device. Continuing the example, the smartphone may generate message data specifying a payment using a cryptocurrency. The smartphone may send the request to the secure device that has been previously paired. Because the requested amount is less than a threshold amount and comes from a paired device, the message is automatically signed, and the signed message data is sent to the smartphone. The smartphone may then send the signed message data to the website, to the appropriate blockchain servers, and so forth.

The secure device supports various functions such as blind-key storage, multiple signature signing, distribution of a private key across several different devices such as secure devices, smart cards, and so forth. Blind-key storage allows for the storage within the secure encrypted memory of the SCE of a private key which is not known outside of the secure encrypted memory. In order to use a blind private key, the user may be directed to enter a passcode using the I/O device of the SCE. Entry of a valid passcode directs the SCE to utilize the private key for signing or other cryptographic operations, without revealing the blind private key.

Multiple signature signing facilitates situations in which a plurality of private keys are used to sign a message. For example, message data may need to be signed using three different private keys in a particular order, in order to generate signed message data that is deemed valid and suitable for inclusion into a blockchain. This is an example of a meta-protocol utilizing individual digital signatures as atomic units.

Multiple signature signing may also be used to improve durability of secrets by allowing for a loss or inaccessibility of some secrets. For example, multiple signature signing may allow for a situation in which a subset of private keys may be used to produce signed message data. In this implementation, the secure device generates signed message data when at least N of M private keys, or their resulting digital signatures, are present (where N and M are non-zero positive integers and N<M). For example, valid signed message data may be generated when 2 of 3 private keys are available for signing. This improves durability preventing loss of capability, such as the ability to generate signed message data, should one of the three keys be unavailable, such as due to loss or theft. Continuing the example, the user may have a first private key in the secure device, a second private key stored on a first smart card, and a third private key stored on a second smart card. The second smart card may be safely stored at another location. In the event that any one private key is unavailable, the other two may still be used, preventing loss to the user because of inaccessibility.

The secure device may interact with other devices and facilitate various transactions between parties. For example, the secure device in a user's home may be in communication with a thermostat, smart electric meter, photovoltaic systems, battery storage system, and so forth. The user may store a private key for a cryptocurrency account in the secure device and setup secure pairing and conditions with an electric utility company. The user may have an agreement with the utility allowing for mutually cooperative operation. For example, as electrical demands peak in the short term, the user's thermostat may be adjusted to reduce power consumption while the battery storage system provides power back to the utility.

The secure device may be paired with the utility and used to encrypt, sign, or otherwise secure the messages between the utility and the user's device to help ensure the security of those transactions and prevent unauthorized access. For example, the messages from the utility that request a decrease in power consumption may be digitally signed. The secure device may verify that the signature is valid and provide this information to the thermostat.

The secure device may also be used to transfer value using digitally signed message data. So long as the pairing remains in place and the conditions for a requested transfer of value are met, the secure device will sign message data. Continuing the example above, the utility may send message data that bills the customer for the previous hour. So long as this message data comes from the paired entity, in this case the utility, and meets the previously set conditions, the secure device may automatically generate the signed message data. In another example, the secure device may be paired with a smart refrigerator and use the pairing to provide for automatic ordering and payment for groceries that are removed.

The signed message data may then be provided to blockchain servers to record the signed message data in the blockchain, transferring value to the utility company. Likewise, as the user's home provides electrical power, the smart meter in the home may generate message data for a transfer of value from the utility company to the user. The message data may be sent to the secure device associated with the utility company, which may then sign the message data and commit the signed message data to the blockchain, transferring value to the user's account.

While the example above involves an electrical utility, other utilities may utilize the system. For example, gas utilities, data processing services, internet service providers, cell phone providers, and so forth may utilize the secure device to provide for dynamic payment. Likewise, the secure device may be used to facilitate payments for other types of goods or services. The secure device may also be used to electronically sign legal documents, facilitate the establishment of secure communications, and so forth.

Illustrative System

FIG. 1 depicts a system 100 that utilizes a secure device to provide cryptographic functions including, but not limited to, message signing, according to one implementation. A user 102 may be present at a facility 104 such as a residence or place of business. The facility 104 may include various systems such as a photovoltaic system 106 that utilizes sunlight to produce electrical power, a battery system to store and supply electrical power, and so forth. The facility 104 may be connected to electrical transmission lines that are connected to a utility distribution system 108. For example, the utility distribution system 108 may comprise a network of electrical power lines, substations, and so forth that may be referred to as the "electrical grid". The utility distribution system 108 facilitates the transfer of electrical power between suppliers of electricity and consumers. For example, the utility distribution system 108 may transfer power from utility sources such as wind turbine farms, solar farms, hydroelectric power stations, and so forth, to consumers such as the facility 104. The utility distribution system 108 may also transfer power from one consumer to another or other devices attached to the grid. For example, during a period of peak usage, the utility distribution system 108 may draw power from the battery power system and photovoltaic system 106 at the facility 104 to provide power to other consumers while additional power generating resources are brought online.

The facility 104 may be connected to a network 110. The connection may be wired or wireless and may provide access to a public or private network. For example, the connection may be provided by an internet service provider and provides access to a network 110 such as the internet. Devices 112 in the facility 104 may use the network 110 to communicate with other devices at the facility 104 or elsewhere. For example, the devices 112 in the facility 104 may include smartphones, tablets, televisions, set-top boxes, thermostats, home automation controls, smart electric meters, appliances, internet of things (IoT) devices, and so forth.

A secure device 114 may be present at the facility 104 and connected to the network 110. For example, the secure device 114 may be connected to a local area network (LAN), which in turn is connected to the network 110. The secure device 114 may communicate with the other devices at the facility 104 using the LAN.

The secure device 114 includes a secure computing environment (SCE) 116. The SCE 116 provides for secure storage of one or more private keys 118 or other secrets. For example, the private keys 118 may comprise private keys used to digitally sign transactions for a distributed ledger, or blockchain, system. The SCE 116 may have one or more I/O devices 120. The SCE 116 is configured to provide a hardened environment in which the private keys 118 or other secrets may be safely stored and maintained with a high level of assurance that they will not be compromised. In the event of a physical or electronic compromise, the SCE 116 may be configured to erase or otherwise render unreadable secrets such as the private keys 118 stored therein.

The SCE 116 may provide various cryptographic functions, including but not limited to, private key generation, hierarchically deterministic address generation, digital signing, signature verification, hash generation, encryption, decryption, and so forth. The SCE 116 is discussed in more detail below with regard to FIG. 2.

In one example depicted in FIG. 1, the smart meter device 112 produces usage data 122 which is sent via the network 110 to a utility billing server 124. The usage data 122 may be indicative of an amount of power consumed during a specified period of time. For example, the usage data 122 may indicate that the facility 104 has consumed 2 kilowatt-hours (kWh) in the last hour. The utility billing server 124 may then generate message data 126 that requests payment for the power consumed. The message data 126 may then be sent to the secure device 114. The secure device 114 receives the message data 126 and may send at least a portion of the message data 126 for processing by the SCE 116. The SCE 116 determines if the message data 126 satisfies one or more conditions. For example, the SCE 116 may determine that the message data 126 is from a device or system that has been previously paired with the secure device 114.

Pairing establishes a trust relationship between the secure device 114 and one or more other devices. The pairing may be confirmed by the user 102 using the I/O devices 120 of the SCE 116. For example, a request for pairing may result in the SCE 116 presenting a user interface that displays information about the pairing request and asks for entry of a specific input in order to establish the pairing. The specific input may be a passcode, address, validation code, and so forth.

A pairing may have one or more rules associated with it. The rules may specify conditions that must be satisfied for the SCE 116 to provide a function, such as digitally signing the message data 126. For example, the conditions may be expressed as particular boundary values that the values in the message data 126 must satisfy. The boundary values may specify a particular type of current, amount of current per transfer, transfer frequency, and so forth. The conditions are discussed in more detail below.

Continuing the example, the message data 126 is processed by the SCE 116 and determined to satisfy one or more conditions. Responsive to this, the SCE 116 uses the private key 118 to generate signed message data 128. The signed message data 128 may comprise at least a portion of the message data 126 or information based on the message data 126 and a digital signature. The digital signature may be used to assert the authenticity of the data in the signed message data 128. For example, message data 126 may include transaction details associated with a transfer of cryptocurrency as recorded in a blockchain. The signed message data 128 may comprise the transaction details and an associated digital signature generated using the private key 118 associated with a cryptocurrency account.

The signed message data 128 may be provided to another device for subsequent use. For example, the signed message data 128 with the cryptocurrency transaction details may be sent via the network 110 to one or more blockchain servers 130. The blockchain servers 130 may then process the signed message data 128. If the signed message data 128 is deemed to be valid, the transaction details may be incorporated into blockchain data 132. The blockchain data 132 and associated transactions are discussed in more detail with regard to FIGS. 3-4.

In one implementation, the utility billing server 124 may interrogate the blockchain servers 130 and to provide asset data 134. The asset data 134 may indicate the transfer of value to the utility company resulting from the transaction in the signed message data 128 having been committed to the blockchain data 132.

The secure device 114 may be in communication via the network 110 with other devices such a support server 136. The support server 136 may operate in conjunction with the secure device 114 to provide various services. For example, the support server 136 may be used to facilitate setup of the secure device 114.

While the system is illustrated as providing signed message data 128 as part of a transaction with a utility, it is understood that the secure device 114 may provide other functions as described in this disclosure. In one implementation the secure device 114 may provide signed message data 128 for one or more of the devices 112. For example, the user 102 may have a smartphone device 112 which has been paired with the secure device 114. Conditions may be associated with the pairing that specify the circumstances in which the SCE 116 will provide signed message data 128 for message data 126 from the smartphone. Continuing the example, the user 102 may have configured the conditions to allow payment transactions from the smartphone that involve a specific cryptocurrency account and that are less than a threshold value to be made to any address twice a day. So long as those conditions are satisfied, the user 102 may use their smartphone to request the secure device 114 create the signed message data 128 representing those transactions.

Figure 2:
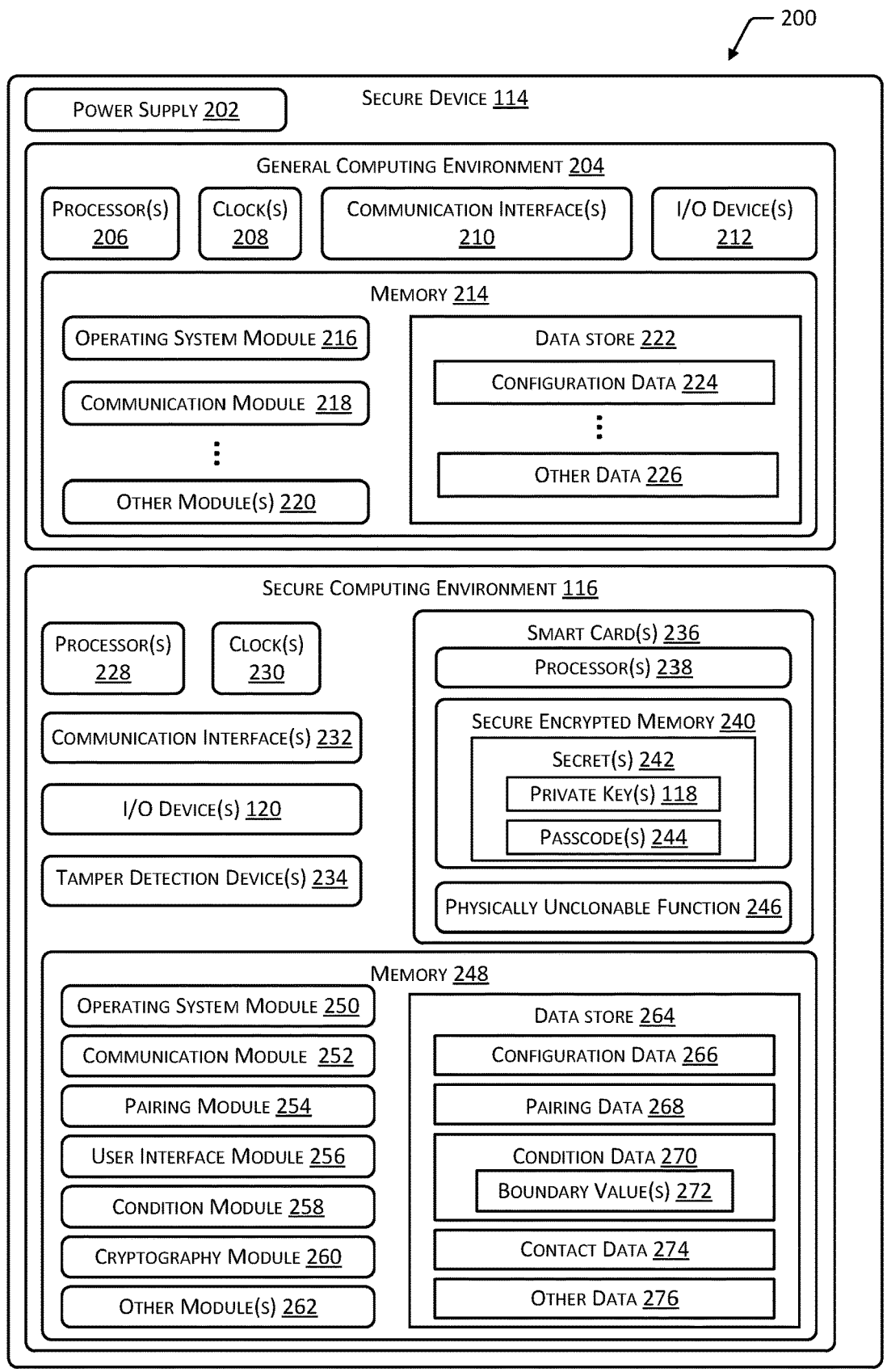
FIG. 2 illustrates a block diagram of the secure device, according to one implementation.

FIG. 2 illustrates a block diagram 200 of the secure device 114, according to one implementation.

The secure device 114 may include a power supply 202. For example, the power supply 202 may transform alternating current at a first voltage obtained from a household outlet to direct current at a second voltage. In some implementations other devices may be used to provide electrical power to the secure device 114. For example, power may be provided by wireless power transfer, batteries, photovoltaic cells, capacitors, fuel cells, and so forth.

The secure device 114 may comprise a general computing environment (GCE) 204. The GCE may include one or more hardware processors 206 (processors) configured to execute one or more stored instructions. The processors 206 may comprise one or more cores. The processors 206 may include microcontrollers, systems on a chip, field programmable gate arrays, digital signal processors, graphic processing units, general processing units, and so forth. One or more clocks 208 may provide information indicative of date, time, ticks, and so forth.

The GCE 204 may include one or more communication interfaces 210. The communication interfaces 210 enable the GCE 204, or components thereof, to communicate with other devices or components. The communication interfaces 210 may include one or more of Inter-Integrated Circuit (I2C), Serial Peripheral Interface bus (SPI), Universal Serial Bus (USB) as promulgated by the USB Implementers Forum, RS-232, Ethernet, Wi-Fi, Bluetooth, Bluetooth Low Energy, ZigBee, long term evolution (LTE), and so forth. For example, the GCE 204 may include a Wi-Fi interface that allows the secure device 114 to communicate with the network 110, a Zigbee interface that allows the secure device 114 to communicate with other devices 112 such as the smart meter, and so forth.

The GCE 204 may include one or more I/O devices 212. The I/O devices 212 may include input devices such as one or more of a switch, keyboard, touch sensor, and so forth. The I/O devices 212 may also include output devices such as one or more of a light, speaker, display, and so forth. In some embodiments, the I/O devices 212 may be physically incorporated within the secure device 114 or may be externally placed.

As shown in FIG. 2, the GCE 204 includes one or more memories 214. The memory 214 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 214 provides storage of computer-readable instructions, data structures, program modules, and other data for the operation of the GCE 204. A few example functional modules are shown stored in the memory 214, although the same functionality may alternatively be implemented in hardware, firmware, or as a system on a chip (SoC).

The memory 214 may include at least one operating system (OS) module 216. The OS module 216 is configured to manage hardware resource devices such as the communication interfaces 210, the I/O devices 212, and provide various services to applications or modules executing on the processors 108. For example, the OS module 216 may implement a variant of the Linux operating system, such as FreeBSD.

The memory 214 may store one or more of the following modules. These modules may be executed as foreground applications, background tasks, daemons, and so forth. For example, the memory 214 may store a communication module 218 and one or more other modules 220. The communication module 218 may be configured to use one or more of the communication interfaces 210 to facilitate communication between other devices and the SCE 116. For example, the communication module 218 may use a network interface to establish a connection to a WiFi wireless access point and receive message data 126 from one of the devices 112. The communication module 218 may then provide the message data 126 to the SCE 116. In some implementations the communication module 218 may provide for encrypted communications with the network interface. The OS module 216, the communication module 218, or other modules 220 may provide additional functions such as network security, denial of service attack mitigation, port scanning detection, and so forth. In the event a potential attack is detected, the GCE 204 may take mitigating actions. For example, the GCE 204 may temporarily disconnect network access, acquire a new network address using dynamic host configuration protocol, suspend communication with the SCE 116, and so forth.

Also stored in the memory 214 may be a data store 222. The data store 222 may use a flat file, database, linked list, tree, executable code, script, or other data structure to store information. The data store 222 may include configuration data 224. For example, the configuration data 224 may include connection parameters for the network interface. Other data 226 may also be stored in the memory 214.

The secure device 114 comprises an SCE 116. The SCE 116 may include one or more hardware processors 228 (processors) configured to execute one or more stored instructions. The processors 228 may comprise one or more cores. The processors 228 may include microcontrollers, systems on a chip, field programmable gate arrays, digital signal processors, graphic processing units, general processing units, and so forth. One or more clocks 230 may provide information indicative of date, time, ticks, and so forth.

The SCE 116 may include one or more communication interfaces 232. The communication interfaces 232 enable the SCE 116, or components thereof, to communicate with other devices or components. The communication interfaces 232 may include one or more of I2C, SPI, USB, RS-232, secure digital host controller (SDHC), smart card interface, near-field communication (NFC) interface, and so forth. In some implementations, communication between the GCE 204 and the SCE 116 may be limited to a particular communication bus, such as SPI or USB.

The SCE 116 may include one or more I/O devices 120. The I/O devices 120 may include input devices such as one or more of a switch, keyboard, touch sensor, and so forth. The I/O devices 120 may also include output devices such as one or more of a light, speaker, display, and so forth. For example, the I/O devices 120 may include a touchscreen that incorporates a display and a touch sensor, allowing for the presentation of data and acquisition of input. These I/O devices 120 may be constrained such that they may only be accessed by the SCE 116, and not the GCE 204.

The SCE 116 provides security against algorithmic and physical forms of intrusion. For example, the separation between the GCE 204 and the SCE 116, as well as other attributes of the SCE 116, minimizes the likelihood of success of an algorithmic attack. To guard against physical attack, the SCE 116 may include, or be in communication with, one or more tamper detection devices 234.

The tamper detection devices 234 provide data indicative of actual or potential tampering with the SCE 116 or elements therein. For example, the tamper detection devices 234 may include switches that indicate that the case of the secure device 114 has been opened. In another example, the tamper detection devices 234 and circuitry may include electrical conductors that, when broken, signal physical tampering. In another example the tamper detection devices 234 may include sensors. For example, temperature sensors, light sensors, voltage measurement devices, magnetic field sensors, ionizing radiation sensors, ultrasonic sensors, and so forth may provide data that is indicative of tampering. The tamper detection devices 234 may be used to detect tampering of components that are part of a single die, a circuit board, an assembly, the SCE 116, and so forth. For example, the I/O devices 120 may include tamper detection devices 234.

In some implementations, the SCE 116 or portions thereof may be configured to self-destruct or otherwise be rendered unusable responsive to tampering. For example, responsive to a determination of tampering, voltage exceeding a threshold value may be passed through at least a portion of the circuitry in the SCE 116, rendering the circuitry unusable. In another example, responsive to a determination of tampering, storage media may be erased, overwritten, randomized, and so forth.

The SCE may include one or more smart cards 236. The smart card 236 may be integral with the SCE 116 or may be removable or wirelessly connected. The smart card 236 may include one or more of a processor 238 or a secure encrypted memory 240. For example, the processor 238 may be configured to provide one or more cryptographic functions. The secure encrypted memory 240 may be used to store one or more secrets 242, such as private keys 118, passcode values 244, and so forth.

Communication with the smart card 236 may be established using one or more electrical contacts, or wirelessly using electromagnetic radiation, magnetic fields, sound, and so forth. For example, the communication interfaces 232 may include an interface that requires electrical contact with the smart card 236 and is compliant with at least a portion of the International Organization for Standards (ISO) and International Electrotechnical Commission (IEC) ISO/IEC 7816 standard. In another example, the communication interfaces 232 may include a wireless interface that is compliant with at least a portion of the ISO/IEC 14443.

The smart card 236 may also include a physically unclonable function (PUF) 246. The PUF 246 may be based on some characteristic of the smart card 236 or a component therein that exhibits physical variation during fabrication. The PUF 246 may be used to produce data that is unique to that particular smart card 236, but is considered stable with respect to a specified range of environmental conditions. Physical variable features such as the distribution of coatings, arrangement of a crystalline lattice, arrangement of magnetic particles, and so forth may be used to generate the PUF 246. In some implementations the PUF 246 may be used as a private key 118, or as random seed to generate a private key 118.

As shown in FIG. 2, the SCE 116 includes one or more memories 248. The memory 248 may comprise one or more CRSM. As described above, the CRSM may be any one or more of an electronic storage medium, a magnetic storage medium, an optical storage medium, a quantum storage medium, a mechanical computer storage medium, and so forth. The memory 248 provides storage of computer-readable instructions, data structures, program modules, and other data for the operation of the SCE 116. A few example functional modules are shown stored in the memory 248, although the same functionality may alternatively be implemented in hardware, firmware, or as a system on a chip (SoC).

The memory 248 may include at least one operating system (OS) module 250. The OS module 250 is configured to manage hardware resource devices such as the communication interfaces 232, the I/O devices 120, and provide various services to applications or modules executing on the processors 108. For example, the OS module 250 may implement a variant of the Linux operating system, such as Free BSD.

The memory 248 may store one or more of the following modules. These modules may be executed as foreground applications, background tasks, daemons, and so forth. These modules may include one or more of a pairing module 254, a user interface module 256, a condition module 258, a cryptography module 260, or other modules 262.

Also stored in the memory 214 may be a data store 264. The data store 264 may use a flat file, database, linked list, tree, executable code, script, or other data structure to store information. The data store 264 may include one or more of configuration data 266, pairing data 268, condition data 270, boundary values 272, contact data 274, or other data 276. For example, the configuration data 266 may comprise settings associated with operation the OS module 250, data indicative of the limits imposed by the communication module 252, and so forth.

The communication module 252 may use one or more of the communication interfaces 232 provide communication between the SCE 116 and the GCE 204. The communication module 252 may implement mailbox functionality, restricting the type of data that may be transferred between the SCE 116 and the GCE 204. The communication module 252 may restrict communication based on frequency of data transfer, size of the data, type of data being transferred, implement a limited set of instructions, and so forth. For example, if the communication module 252 receives message data 126 from the GCE 204 that is too large, the communication module 252 may erase the message data 126. In another example, the communication module 252 may suspend communications when a number of messages per unit time exceeds a threshold value. In some implementations, if the communication module 252 or other module detects activity that exceeds one or more thresholds, mitigating actions may be taken. These mitigating actions may include, but not limited to, erasure of the secure encrypted memory 240, rendering one or more components of the SCE 116 inoperable, and so forth. For example, if the number of invalid instructions processed by the communication module 252 exceeds a threshold count within a predetermined period of time, the secure encrypted memory 240 may be erased. Likewise, the communication module 252 may impose limits on outbound communication to the GCE 204.

The pairing module 254 may generate or update the pairing data 268. Pairing indicates an established and trusted relationship between the secure device 114 and another device or system. The other device may be another secure device 114. The pairing module 254 may be configured to participate in a pairing process. For example, the communication module 252 may receive message data 126 from the GCE 204 that comprised data associated with pairing, such as a source identifier, a source address, a public key, and so forth. The communication module 252 passes the message data 126 to the pairing module 254 for processing.

The pairing module 254 may use the user interface module 256 to present a user interface via the I/O devices 120 in the SCE 116. For example, the user interface module 256 may present a prompt on a touchscreen asking if the user 102 approves the pairing. In some implementations, the user 102 may also be prompted to input a validation code or other data. Upon entry of approval, the validation code, or a combination thereof, the pairing module 254 may generate pairing data 268 indicative of the relationship. The pairing module 254 may then send a pairing response to the GCE 204, that ultimately is transmitted to the device to be paired with.

The pairing module 254 may implement one or more techniques for pairing. For example, the pairing module 254 may utilize a Diffe-Hellman key exchange.

During pairing, some data may be transferred over the network, such as received at the SCE via the GCE. For example, the secure device and the other device may exchange public keys, signed messages, and so forth.

The condition module 258 may be used to assess incoming message data 126. The condition module 258 may assess values of the incoming message data 126 against one or more of the pairing data 268 or the condition data 270 and corresponding boundary values 272.

In some implementations, the condition module 258 may be configured to disregard all message data 126 that is not associated with a paired device as indicated in the pairing data 268. For example, a paired device 112 sends message data 126 to the secure device 114 for signing. The condition module 258 checks a source address, signature data, or other values in the message data 126 to determine if the message data 126 is associated with pairing data 268 indicative of a pairing that is still in force.

Each pairing, as indicated in the pairing data 268, may have one or more different rules or conditions associated with that pairing. These conditions may specify limits designated by the user 102, administrator, and so forth.

Continuing the earlier example, after determining a valid pairing exists, the condition module 258 then compares one or more other values of the message data 126 to determine if they satisfy one or more of the conditions specified in the condition data 270. The condition data 270 may indicate particular fields of data and the corresponding boundary values 272 for those fields. For example, the field may be "type of currency" and the boundary value 272 may be "ETH".

The condition data 270 may be used to specify one or more of a type of asset that is permitted, a type of transaction that is permitted, a maximum number of signed messages within a specified interval of time, a maximum quantity of assets in a single transaction, a minimum quantity of assets in a single transaction, a maximum quantity of assets transferred per interval of time, and so forth. In other implementations, other conditions may be specified with corresponding boundary values 272.

The conditions specified by the condition data 270 may include a requirement for verification by the user 102 before the signed message data 128 is determined. For example, the user interface module 256 may be used to accept input from the user 102 indicative of approval to sign the message data 126. In one implementation the input provided by the user 102 may comprise a passcode 244 that, when entered using the I/O device 120 and subsequently validated, is used to access one or more of the private keys 118. For example, the passcode 244 may be used to authorize or otherwise indicate use of a "blind" private key 118. In another implementation, instead of or in addition to the passcode 244, a removable smart card 236 may be required. With this implementation, the SCE 116 utilizes the removable smart card 236 as a form of second factor authentication.

The cryptography module 260 performs one or more cryptographic functions. These cryptographic functions may include, but are not limited to, private key generation, creation of one or more pieces of a private key 118 for sharing, hierarchically deterministic address generation, digital signing, hash generation, multiple signature signing, encryption, decryption, and so forth. For example, the cryptographic functions may include an implementation of secret sharing, such as described by Adi Shamir, George Blakely, and so forth, that allow for a secret 242 to be divided into several pieces that may then be distributed. The private key 118 may then be determined using the pieces, or a subset of those pieces. In another example, the cryptographic functions may produce, based on one or more of the private keys 118, a digital signature that is used to create the signed message data 128.

In some implementations, one or more of the cryptographic functions may be performed at least in part by the smart card 236. For example, a cryptographic processor on the smart card 236 may be used to generate a signature.

The memory 248 may store contact data 274. The contact data 274 comprises information about one or more participants or contacts that may be parties to a transaction involving the secure device 114. For example, the contact data 272 may comprise information such as the names and cryptocurrency addresses, pictures, and so forth of friends, family, vendors, and so forth that the user 102 wants to transfer assets to.

Public key values, cryptocurrency addresses, and other data associated with transactions involving cryptography can be troublesome for the user 102 to deal with. Humans may have difficulty working with long sequences of letters and numbers. For example, humans may have difficulty discerning small differences between those strings, remembering a cryptocurrency address, and so forth. As a result, there is the potential for the user 102 to incorrectly select one cryptocurrency address when another is intended, or otherwise introduce errors into the process of generating the signed message data 128.

The user interface module 256 may be used to provide, with the I/O devices 120, at least a portion of the contact data 274 that is associated with the message data 126. In one implementation, the user interface module 256 may use the destination address in the message data 126 to retrieve a particular record from the contact data 274. For example, if the message data 126 is a payment transaction that includes the destination address which matches an entry in the contact data 274 associated with "Utility Company, Inc", the name in the contact data 274 and a picture of the "Utility Company, Inc." logo on the display. In some situations, the user 102 may be prompted to provide an approval to the transaction, enter a passcode 244, and so forth. By presenting this information in the user interface, the user 102 is quickly and easily able to see who the recipient is of that transaction. This facilitates discovery of unwanted or incorrect transactions being signed. As a result, overall security of the system is improved.

The other modules 262 may provide other functions.

In one implementation, the SCE 116 may comprise the Kinetis K81 microcontroller unit (MCU) from NXP Semiconductors N.V. of Eindhoven, the Netherlands. In other implementations, the SCE 116 may comprise other devices.

Figure 3:
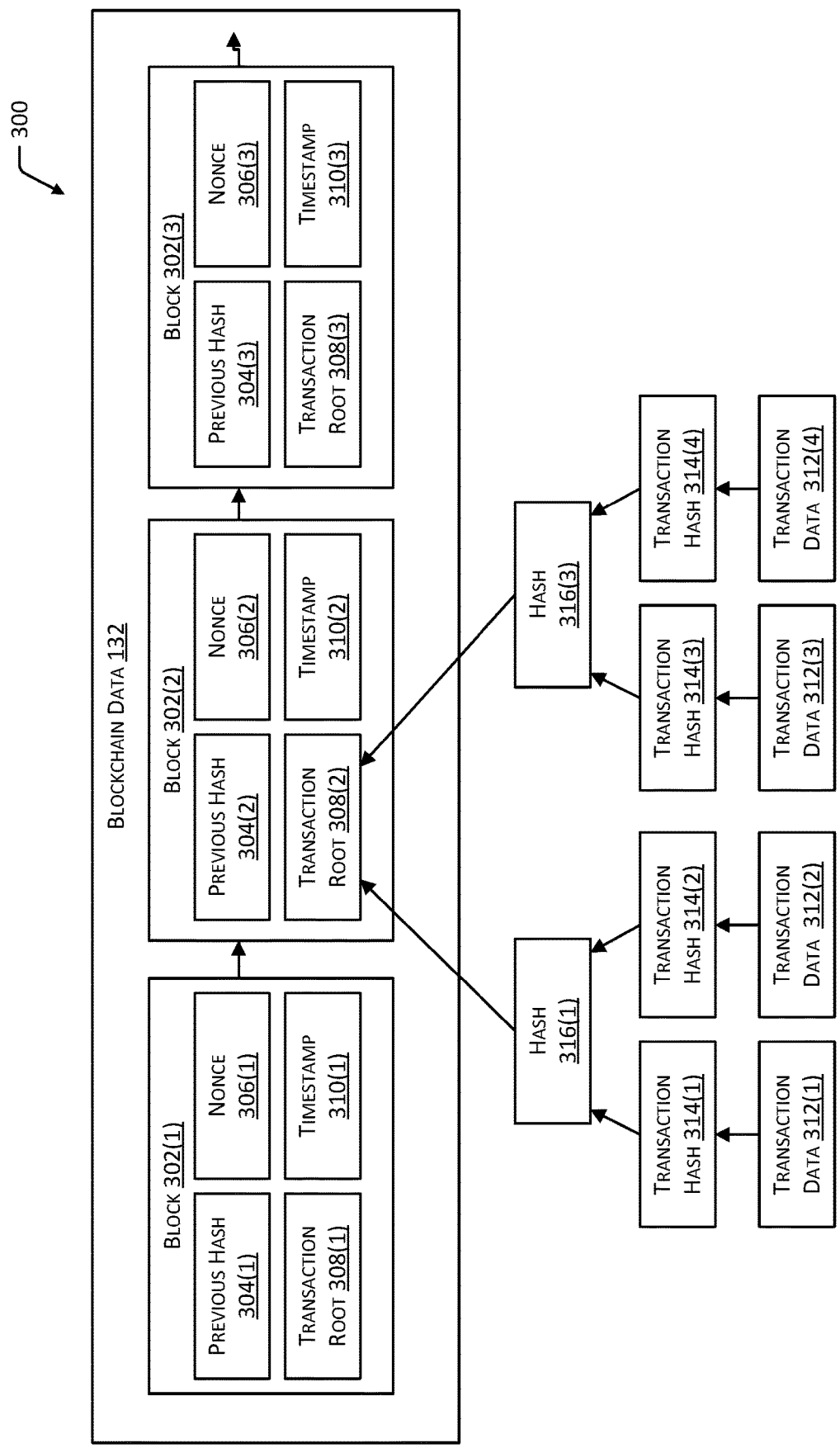
FIG. 3 illustrates blockchain data, according to one implementation.

FIG. 3 illustrates a portion 300 of blockchain data 132, according to one implementation. A distributed ledger or blockchain comprises a system that utilizes a network of peers that provide distributed data storage and processing of blockchain data 132 that provides a canonical record. The blockchain data 132 maintains information about a current state as well as how that current state was arrived at.

To maintain a deterministic state at all times, data is recorded into the database in blocks 302(1), 302(2), 302(3), ..., 302(B). Each block 302 comprises a block header that includes a previous hash 304, a nonce 306, a transaction root 308, and a timestamp 310. The block 302 may include payload data, such as details of a transaction, contract parameters, and so forth. In some implementations the block 302 may include other data that facilitates proof and verification of the transactions which are contained in that block as well as the precedence of the existence of that block 302 relative to other blocks 302 in the blockchain data 132. Blocks 302 are linked together over time by recording the previous hash 304 of the previous block 302 in the subsequent block 302. For example, block 302(2) includes the previous hash 304(2) that is derived from the data in the block 302(1). The previous hash 304 of a given block may be constructed of a hash of data contained in the block 302 as well as a nonce 306 which forms a block hash which meets the requirements of consensus of the given blockchain.

Transaction data 312 is hashed to produce a transaction hash 314. A plurality of transaction hashes 314 may then be hashed again in a deterministic way with one another, such as using a Merkle tree, to form a hash 316, until they are all represented by a single hash which is stored as the transaction root 308. The hashing process allows the verification of the existence of all transaction data 312 in a block 320 because the transaction data 312 can be shown to be part of the transaction root 308 recorded in the block header in the block 302. In some implementations, the transaction data 312 may include a message cryptographically signed by the current owner of an asset transferring the asset to another address. For example, the user 102 may use the secure device 114 to create signed message data 128 that is then used as transaction data 312 which is subsequently committed to the blockchain data 132.

Figure 4:
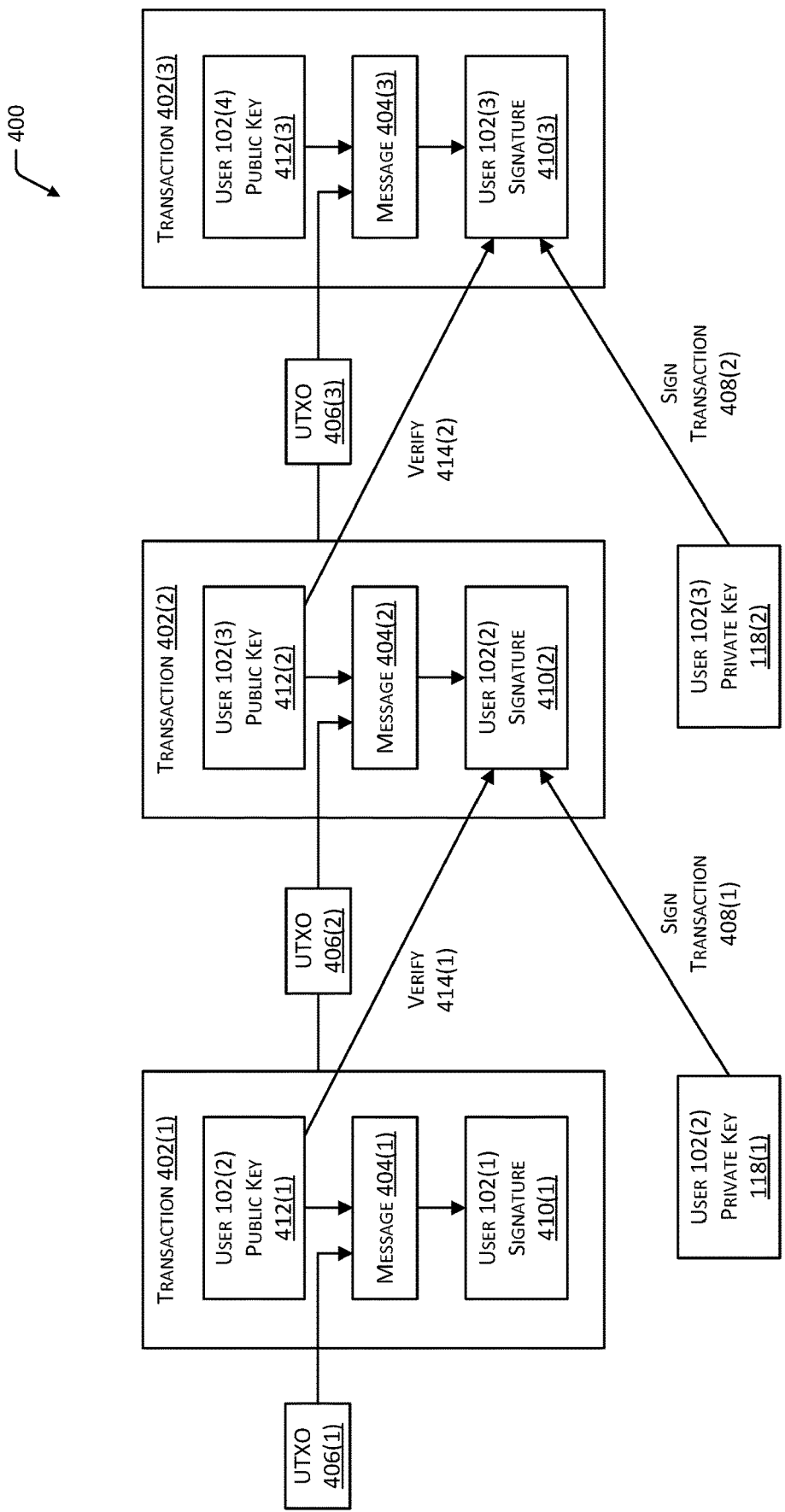
FIG. 4 illustrates a process of signing a message which transfers ownership of assets recorded in a blockchain, according to one implementation.

FIG. 4 illustrates a process 400 of signing a message which transfers ownership of assets recorded in a blockchain, according to one implementation. The ownership of assets recorded by the blockchain data 132 is determined by the ability of a participant to cryptographically sign a message which moves assets from a first account to a second account. The ability to create the signed message data 128 which will be honored by the blockchain servers 130 may be predicated on the ability to sign the message data 126 with a private key 118 that corresponds to a source account or an address of the assets.

FIG. 4 illustrates one implementation of an unspent transaction output (UTXO) model, such as used by some cryptocurrency and other blockchain systems. In this example, assets originating with user 102(1) were transferred to user 102(2), who is now transferring those assets to user 102(3).

To create a transaction 402(1), user 102(2) creates a message 404(1) to transfer the asset (previously received from user 102(1)) to user 102(3). The message 404(1) includes the UXTO 406(1) that user 102(2) is spending, the destination address of user 102(3), and other data such as the quantity of assets to be transferred. User 102(2) signs 408(1) the message 404(2) with their user 102(2) signature 410(2) that is generated using their private key 118(1). For example, the secure device 114 may be used to generate the signed message data 128 that is part of the message 404(2). The message 404(2) is then sent to the blockchain servers 130 which processes and records the transaction in the blockchain data 132. User 102(2)'s public key 412(1) may be used to verify 414 the user 102(2) signature 410(2). Once recorded in the blockchain data 132, user 102(3) can now create another UXTO 406(3) that becomes part of the message 404(3). User 102(3) then signs 408(2) the message 404(3) using their private key 118(2).

The process may continue on, with users 102 subsequently transferring assets to one another. In other implementations other models may be used to record the transfer of assets. For example, an account balance model may be used, such as implemented in the blockchain system promulgated by Ethereum.org.

FIG. 5 is a block diagram 500 of data associated with operation of the secure device 114, according to one implementation. The data is depicted in tabular format by way of illustration and not necessarily as a limitation. In other implementations other data structures may be used. The following fields and values are depicted by way of illustration and not necessarily as a limitation.

The message data 126 is depicted. The message data 126 may include one or more message fields 502 and their corresponding message values 504. The message fields 502 and their corresponding message values 504 may vary. For example, the same device 112 may generate first message data 126 with a first set of message fields 502 at a first time and then generate second message data 126 with a second set of message fields 502 at a second time.

The message fields 502 may include one or more of source identifier (ID) 502(1), destination address 502(2), transaction type 502(3), transaction amount 502(4), currency type 502(5), timestamp 502(6), and so forth. For example, the source ID 502(1) may be indicative of the source of the message data 126. The destination address 502(2) may comprise a cryptocurrency address, indicative of a particular account to which an asset is to be transferred. The transaction type 502(3) may be indicative of whether the transaction is a cryptocurrency asset transfer. The transaction amount 502(4) may be indicative of the quantity or value of asset to be transferred by the message. The currency type 502(5) may be indicative of a particular type of cryptocurrency, such as Ethereum, Bitcoin, and so forth. The timestamp 502(6) may provide data indicative of when the message data 126 was generated. Other message fields 502 may be used. For example, the message data 126 may comprise smart contract parameters.

The contact data 274 may include one or more contact fields 506 and their corresponding contact values 508. The contact fields 506 may include one or more of contact identifier (ID) 506(1), user identifier (ID) 506(2), name 506(3), digital signature 506(4), image data 506(5), telephone number 506(6), network address 506(7), destination address 506(8), and so forth. The contact ID 506(1) may identify a particular contact record. The user identifier (ID) 506(2) may comprise information indicative of a particular user, such as with respect to another system. The name 506(3) stores the name of the person, company, or other entity associated with the contact record. The digital signature 506(4) may comprise a public key value, signing hash, and so forth that is associated with the contact record. The image data 506(5) may comprise an image that is associated with the contact record. For example, the image data 506(5) may comprise a picture of the user, a logo of a company, and so forth. The telephone number 506(6) may comprise the telephone number that is associated with the contact record. The network address 506(7) may comprise an internet protocol (IP) address, media access control (MAC) address, username, and so forth. The destination address 506(8) may comprise a cryptocurrency address, indicative of a particular account to which an asset is to be transferred.

The pairing data 268 may include one or more pairing fields 510 and their corresponding pairing values 512. The pairing fields 510 may include one or more of a pairing identifier (ID) 510(1), a pair name 510(2), an expiration 510(3), a pair key data 510(4), and one or more contact ID 510(5). The pairing ID 510(1) may identify a particular pairing record. The pair name 510(2) may store a name of the pairing that may be presented in the user interface using the I/O devices 120. The expiration 510(3) specifies the date or conditions under which the pairing will cease. The pair key data 510(4) may comprise one or more of a public key, private key, and so forth. The pair key data 510(4) may be used for authentication, encryption, decryption, and so forth. The contact ID 510(5) provides an association to the contact ID 506(1) in the contact data 274. A pairing may be associated with one or more contacts.

Operation of the SCE 116 to generate signed message data 128 or provide other functionality may be contingent on satisfaction of one or more conditions 516. In some implementations, the conditions 516 may be expressed in terms of the pairing data 268 and the condition data 270.

The condition data 270 may include one or more condition fields 514 and their corresponding boundary values 272. The condition fields 514 may include one or more of a pairing identifier (ID) 514(1), allowed currency 514(2), maximum amount of asset allowed to be transferred per transfer 514(3), maximum transfer frequency of transfers per specified time 514(4), maximum amount permitted in a specified time interval 514(5), whether the transfer requires approval 514(6), a destination address 514(7), and so forth.

The pairing ID 514(1) may identify a particular pairing record that the condition data 270 is associated with. Each pairing may be associated with multiple different sets of condition data 270. For example, the user 102(1) may establish a pairing between their secure device 114 and another secure device 114 of user 102(2) "George". Once paired, the user 102(1) may specify different sets of condition data 270 to handle different usage scenarios. For example, a first set of condition data 270 may allow for automated transfers of assets to George's account up to a certain amount, while a second set of condition data 270 also associated with the same pairing requires approval.

The allowed currency 514(2) specifies one or more types of cryptocurrency that may be utilized in a transfer. The maximum amount of asset allowed to be transferred per transfer 514(3) specifies how much value may be transferred in by a single message. The maximum transfer frequency of transfers per specified time 514(4) sets a limit on how many messages may be signed in a particular period. For example, the conditions may limit to no more than 1 transfer every 24 hours. A maximum amount permitted in a specified time interval 514(5) may be specified. For example, the conditions may limit to no more than 80 ETH being transferred every 48 hours. The require approval 514(6) field may be used to determine whether the SCE 116 may proceed to sign a message automatically that otherwise satisfies the conditions 516, or whether some input to the I/O device 120 is required to proceed. The destination address 514(7) may comprise a cryptocurrency address, indicative of a particular account to which an asset is to be transferred.

In some implementations, the condition data 270 may store alternative options for the same pairing. For example, the pairing with "Utility Company, Inc." may have two sets of condition data 270. A first set of condition data 270 may specify particular boundary values 272 that allow for automatic approval, while a second set of condition data 270 specifies particular values 272 that require approval. Continuing the example, the first set of condition data 270 may have a boundary value 272 for the max amount per transfer 514(3) that is less than the second set of condition data 270.

The SCE 116 may place restrictions on changes to condition data 270. For example, the SCE 116 may limit the number of times within a predetermined period of time that one or more boundary values 272 may be changed. In another example, the SCE may place other limits, such as limiting a maximum increase to a boundary value 272 in a predetermined period of time to a specific percentage. Such limitations may be used to limit the effectiveness of attacks against the user 102 to either coerce or defraud the user 102 into approving the signing of message data 126.

The SCE 116 may place restrictions on changes to the contact data 268, pairing data 268, and so forth. For example, the SCE 116 may impose limits on the number of pairings that can be created within a threshold period of time.

During operation, the condition module 258 within the SCE 116 may use the message data 126, contact data 274, pairing data 268, and condition data 270 to determine the signed message data 128 which includes a digital signature 518.

Figure 6:
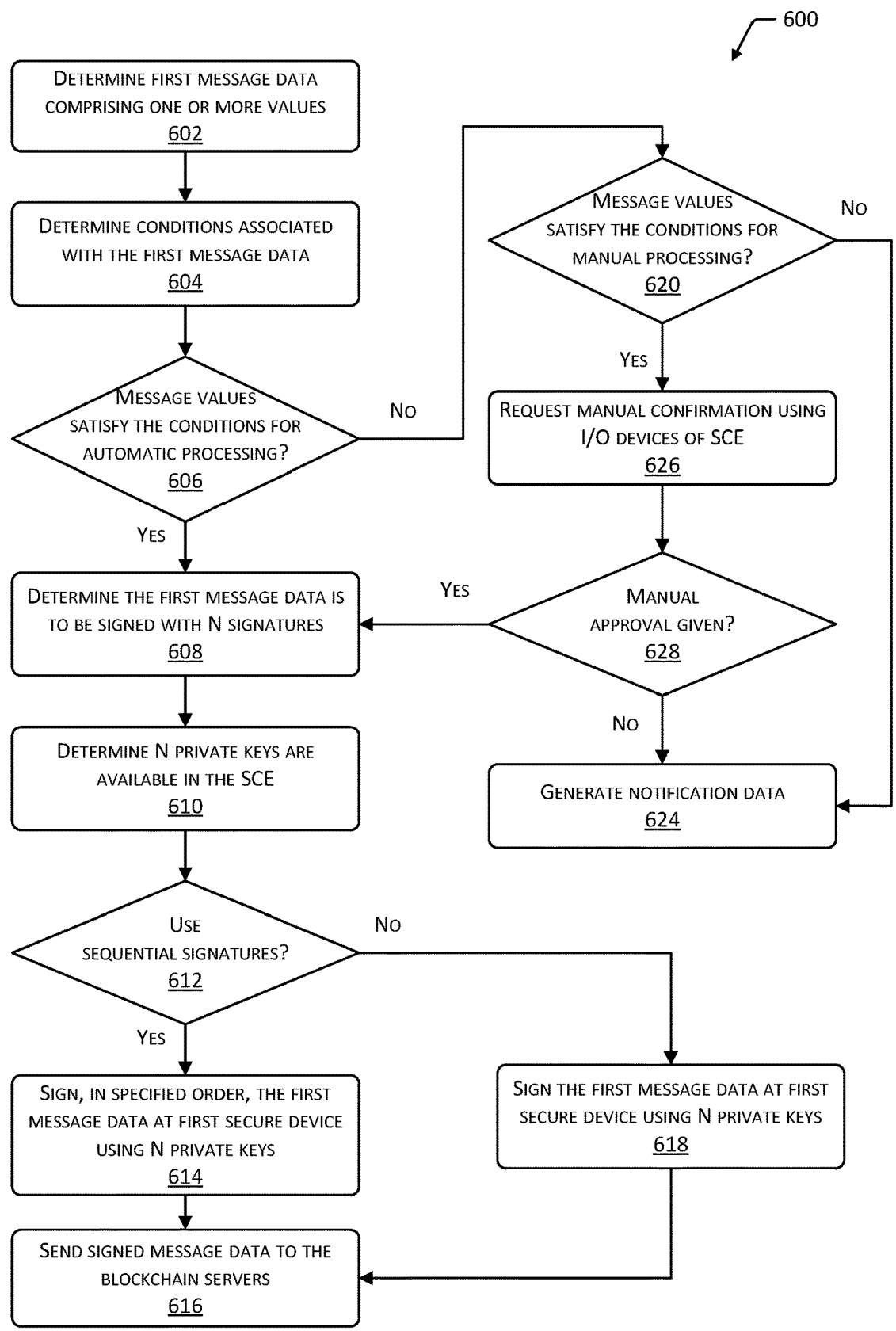
FIG. 6 illustrates a flow diagram of a process to sign a message using the secure device, according to one implementation.

FIG. 6 illustrates a flow diagram 600 of a process to sign a message using the secure device 114, according to one implementation.

At 602 first message data 126 comprising one or more values is determined. For example, the secure device 114 may generate the first message data 126, or it may be received from an external device, such as the one or more devices 112. The first message data 126 may comprise data associated with a transaction, such as a transfer of assets using a cryptocurrency.

At 604 one or more conditions associated with the first message data 126 are determined. For example, the message fields 502 and their corresponding message values 504 may be accessed.

At 606 a determination is made as to whether the message values 504 satisfy the conditions 516 for automatic processing. For example, if the require approval 514(6) field in the condition data 270 indicates that, for this particular pairing manual approval is not required, the process may proceed to 608. If manual approval is required, the process may proceed to 620. In another example, if the first message data 126 is not associated with pre-existing pairing data 268, the process may proceed to 620.

At 608 the process determines if the first message data 126 is to be signed with N signatures, where N is a nonzero integer greater than 0. For example, the first message data 126 may be designated for signature using a single private key 118.

At 610 the N private keys 118 needed for signature are determined to be available in the SCE 116. For example, the presence of a smart card 236 that contains a specified private key 118 in secure encrypted memory 240 that is associated with the destination address 502(2) in the first message data 126 may be determined.

At 612 a determination is made as to whether sequential multiple signatures, that is signing using multiple signatures or private keys 118 as applied in a particular order, are to be used. The N signing keys may be obtained from one or more of the secure device 114, other secure devices 114, smart cards 236, or other devices 112. For example, the signing may require a first private key 118(1) stored in the internal smart card 236(1), a second private key 118(2) stored in a first removable smart card 236(2) that is in communication with the SCE 116, and a third private key 118(3) stored in a second removable smart card 236(3) that is in communication with the SCE 116. This is discussed in more detail with regard to FIG. 9. If yes, the process proceeds to 614. If not, or if only a single signature is required, the process proceeds to 618.

At 614, the first message data 126 is signed at the first secured device 114 using N private keys, in the specified order, to produce the signed message data 128. For example, the N private keys may be stored in the SCE 116, in smart cards 236 that are in communication with the SCE 116, and so forth.

At 616 the signed message data 128 is sent to an external device. For example, the signed message data 128 may be sent to the blockchain servers 130.

Returning to 612, if sequential signatures are not required or if only a single signature is required, the process proceeds to 618.

At 618 the first message data 126 is signed using the N private keys, but without regard to a particular order of signing, to produce the signed message data 128. The process then proceeds to 616.

Returning to 606, if manual approval is required or the first message data 126 is otherwise ineligible for automatic processing, the process may proceed to 620. At 620 a determination is made as to whether the first message data 126 satisfies the conditions 516 for manual processing. For example, manual processing may be disallowed if no pairing data 268 associated with the first message data 126 is available. If the conditions for manual processing are not satisfied, the process may proceed to 624.

At 624, notification data may be generated. For example, the notification data may be indicative of the failure. The notification data may be presented on the I/O devices 120, sent to the GCE 204, and so forth.

Returning to 620, if the message values 504 do satisfy the conditions 516 for manual processing, the process proceeds to 626.

At 626 a manual confirmation is requested using the I/O devices 120 of the SCE 116. For example, the user interface module 256 may present a user interface on a display device that indicates manual confirmation is required. In some implementations one or more of the message values 504, associated contact data 270, and so forth may be presented. For example, the image data 506(5) associated with the destination address 502(2) in the message value 504 may be presented on the display. The user 102 may then provide input using an input device, such as a touch sensor.

The secure device 114 may provide a notification indicative of message data 126 that is awaiting confirmation. In one implementation, the secure device 114 may use the I/O devices 120 to present an audible output, present visual output, and so forth. In another implementation, the secure device 114 may use the network 110 to send a message to a device 112. For example, the secure device 114 may send a short message service (SMS) message or email to the user's 102 smartphone 112 indicating that a message is awaiting confirmation.

Requests for manual confirmation may be stored and presented at a later time to the user 102. For example, the secure device 114 may receive message data 126 throughout the day. Later in the day, the user 102 may use the I/O devices 120 to review those transactions that require manual confirmation and approve or deny signing.

At 628, if manual approval is not given, the process proceeds to 624. For example, if the user 102 enters "no" to the prompt for approval, enters an incorrect passcode 244, or fails to provide an input within a specified period of time, the SCE 116 may deem no approval was given. If manual approval is given, the process proceeds to 608.

Figure 7:
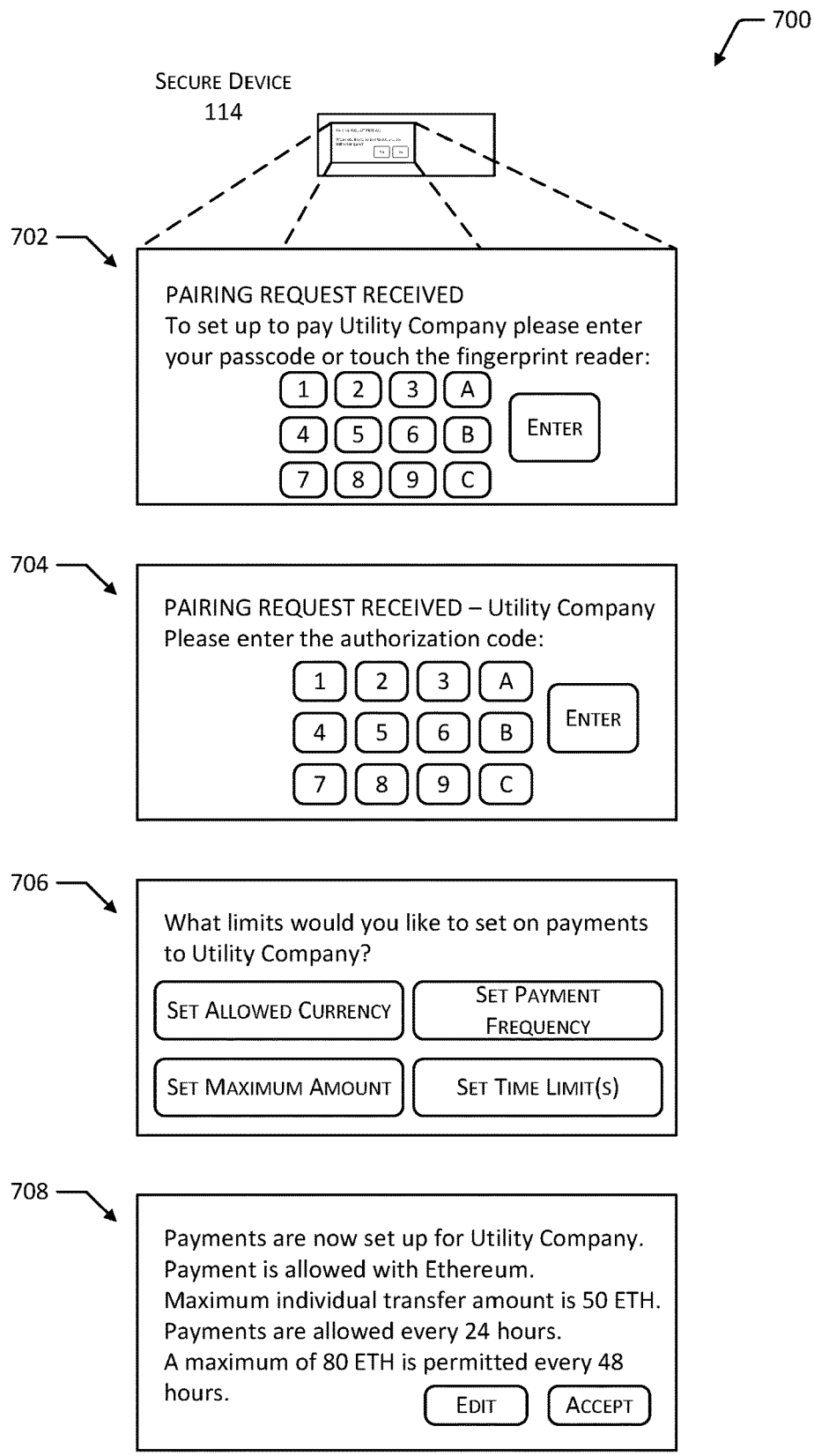
FIG. 7 depicts a user interface of the secure device used to pair the secure device with another device and to set conditions for signing messages, according to one implementation.

FIG. 7 depicts a user interface 700 of the secure device 114 used to pair the secure device 114 with another device and to set conditions 516 for signing messages, according to one implementation.

As described above, pairing establishes a trust relationship between the secure device 114 and another device. In one implementation, the pairing module 254 may use the user interface module 256 to provide the user interface.

At 702 the user interface presents a prompt that a pairing request has been received, and details about the proposed pairing. The prompt may include that a passcode be entered, communication with a smart card 236 containing a particular private key 118 or other value, and so forth. In other implementations, other information may be used to identify the user 102. For example, the user 102 may use a fingerprint reader I/O device 120 to provide biometric data.

At 704 the user interface requests entry of an authorization code. For example, to complete pairing, out of band (OOB) data may need to be exchanged. In some implementations, these may be randomly generated values that expire.

At 706 the user interface, after receiving a valid authorization code, provides the user 102 with the opportunity to create one or more conditions 516 that will be associated with the pairing. For example, as shown here, the user 102 may select allowed currency types, maximum amounts, permissible payment frequencies, time limits, and so forth such as described above with regard to the condition data 270.

At 708 the user interface, after receiving inputs with regard to the one or more conditions 516, presents a confirmation screen. The confirmation screen may provide controls allowing the user to edit or accept the proposed conditions. Once accepted, the SCE 116 may process subsequent message data 126 according to those conditions 516.

Figure 8:
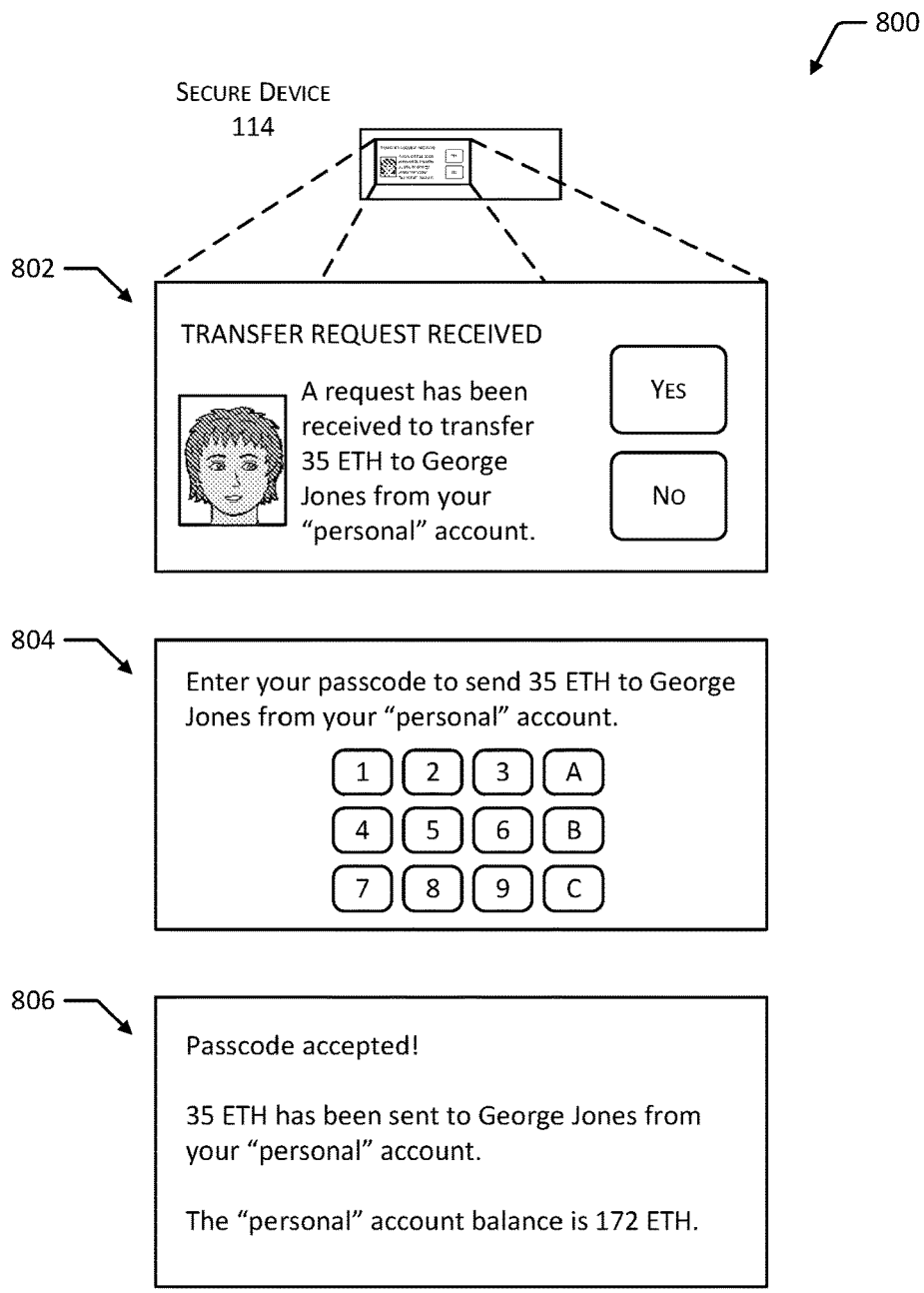
FIG. 8 depicts a user interface of the secure device that may be used to receive approval for signing message data using an input device in a secure computing environment, according to one implementation.

FIG. 8 depicts a user interface 800 of the secure device 114 that may be used to receive approval for signing using an input device in the SCE 116, according to one implementation.

As described above, users 102 may find the length and nature of information such as cryptocurrency addresses difficult to use. For example, a user 102 may not be able to tell if a first cryptocurrency address differs from a second without careful inspection or using a computing device to make the comparison. As a result, it may be possible for users 102 to become confused or be deceived into generating signed message data 128. The user interface 800 as described herein significantly reduces the likelihood of inadvertent signing by presenting information in the user interface that is easier for the user 102 to understand.

At 802 the user interface presents a prompt that a transfer request has been received, and details about the proposed transfer. For example, the user 102 may have setup a pairing with a secure device 114 associated with George Jones, but may have specified a condition in which transfer from the user's 102 account to George needs to be manually approved if the transfer exceeds a threshold maximum value of 10 ETH.

In the user interface, the user 102 is provided with an image that has been associated with the first message data 126. For example, the picture of George may be retrieved from the contact data 274, based on the destination address 502(2) in the first message data 126, and presented in the user interface. This provides a quick and distinctive indicia to the user as to the recipient or beneficiary as specified in the first message data 126.

The user interface also presents the type and amount of asset to be transferred. Also shown is the source of those assets. For example, the user interface here indicates that the assets are from user 102's "personal" account. The designation of a particular account or cryptocurrency address may have been previously made by the user 102. For example, when a new private key 118 for a cryptocurrency is added to the SCE 116, the user 102 may specify a convenient name that may be subsequently presented. As a result, the user 102 does not need to remember which long and complicated private key value is associated with the proposed transaction. The user interface provides approval controls, allowing the user to approve or disapprove generating the signed message data 128.

At 804 the user interface requests entry of a passcode 244. For example, to prevent unauthorized transfers, entry of a valid passcode 244 may be required for manual approval. In other implementations other types of input may be used. For example, biometric input such as acquisition of a fingerprint using a fingerprint scanner may be used.

At 806, the user interface, after receiving a valid passcode 244, presents at least a portion of the message data 126 that will be incorporated into the signed message data 128.

Figure 9:
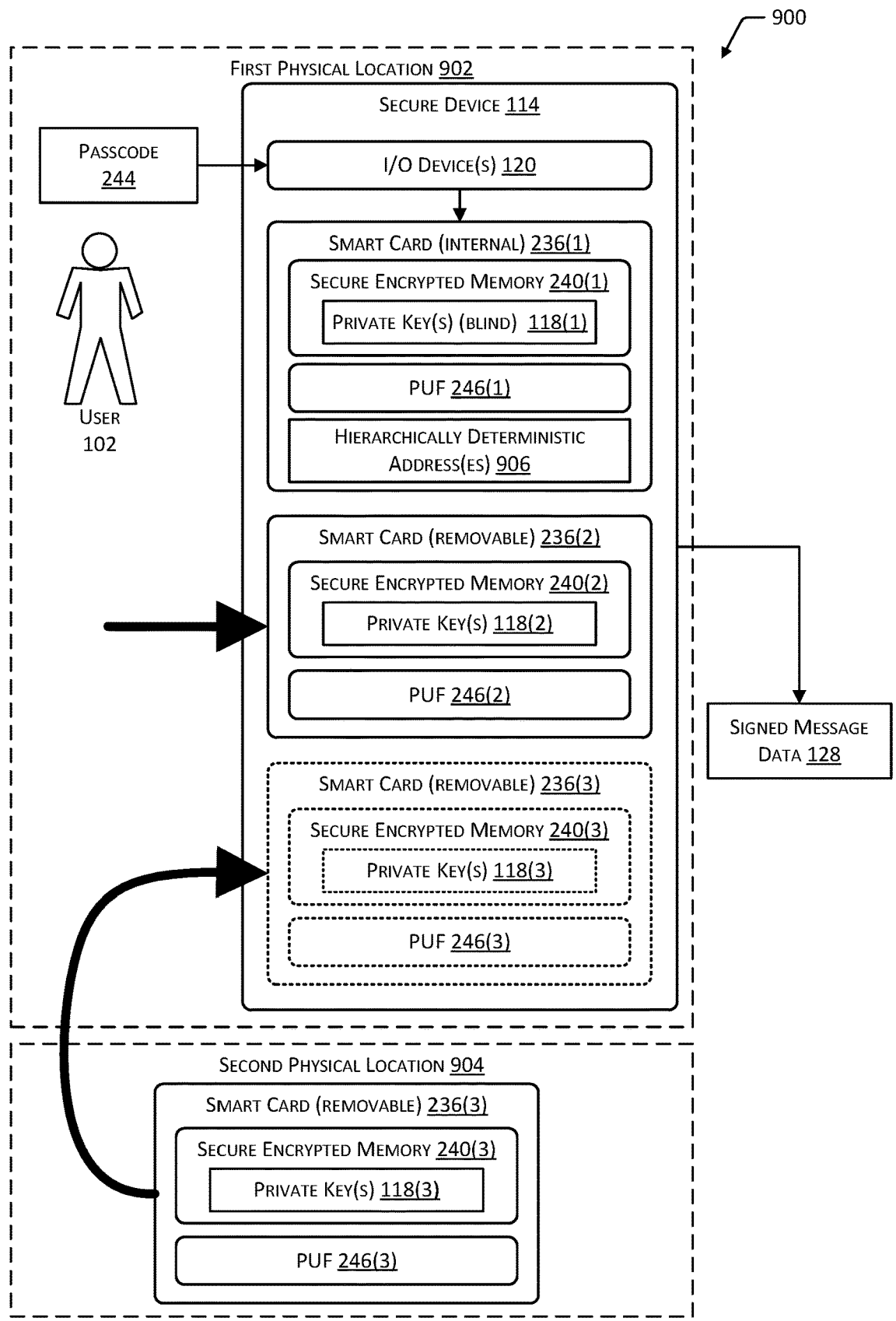
FIG. 9 illustrates a block diagram of a multisignature signing with the secure device using a blind key, according to one implementation.

FIG. 9 illustrates a block diagram 900 of a multisignature signing with the secure device 114 using a blind key, according to one implementation. The use of techniques such as one or more of secret key sharing or multisignature signing allows for improved durability of secrets 242. As described above, loss of a private key 118 may result in loss of associated assets. For example, if a private key 118 is stolen or accidentally destroyed, the assets are no longer available to user 102.

In situations where the user 102 wishes to improve durability, increase security, mitigate loss of private keys 118, and so forth, the secure device 114 may be used to facilitate multisignature signing. For example, in order to generate signed message data 128 that authorizes a transfer of assets, the user may require that N of M private keys are used to produce the signed message data 128. N and M are non-zero positive integers and N<M. In some implementations the order in which the signatures are created may be specified.

The user 102 may have stored the private keys 118(1)-118(N) on different devices. For example, the user 102 may have configured a multiple signature using three private keys. The private key 118(1) may be stored on the internal smart card 236(1) of the secure device 114 that is located at the facility 104(1) at a first physical location 902. The private key 118) may be a "blind" private key in that the user 102 has no knowledge of what the actual value is. For example, the blind private key 118(1) may be generated within the smart card 236(1) based on the PUF 246(1). In order for the blind private key 118(1) to be used, entry of the passcode 244 with the I/O devices 120 of the secure device 114 may be required.

The private key 118(2) may be stored on a removable smart card 236(2), that the user 102 may keep in a safe in the facility 104(1). The private key 118(3) may be stored on a removable smart card 236(3) that is stored offsite, such as at another facility 104(2) at a second physical location 904.

If the signing requires the presence of all three keys, the removable smart card 236(3) may be transported to the first physical location 902 and placed in communication with the secure device 114. Once in communication, the signed message data 128 may be generated.

To improve the durability and prevent loss of the ability to generate the signature due to accidental loss of one of the private keys 118, the multisignature was configured to permit signing using less than all of the private keys 118. For example, the signed message data 128 may be generated using 2 out of the 3 private keys 118. This improves the durability by allowing for signing to occur even if a private key 118 is unobtainable. Continuing the example, if the secure device 114 is stolen, it is unable to properly sign because the passcode 244 required for use of a blind private key 118(1) is not available. An attempt to tamper with or force retrieval of the blind private key 118(1) would result in the erasure of that blind private key 118. Meanwhile, the private key 118(2) stored on the removable smart card 236(2) is in the user's 102 safe while the private key 118(3) stored on the removable smart card 236(3) is at the second physical location 904.

Even with the loss of the secure device 114, the user 102 is still able to generate signed message data 128 with the multisignature configuration. The user 102 obtains access to another secure device 114, retrieves the two removable smart cards 236(2) and 236(3), places them into communication with the secure device 114, and proceeds to generate signed message data 128.

The above techniques may also be used in conjunction with a shared secret algorithm, in which the private key 118 itself is divided across several different devices, such as secure device 114, smart cards 236, physical media, and so forth. For example, the secret sharing scheme promulgated by Adi Shamir may be used to create data that is representative of a piece of the private key 118 that is needed to generate the signed message data 128. This data may then be stored on separate devices, such as in the internal smart card 236(1), and the removable smart cards 236(2)-(3).

In some implementations one or more of the smart cards 236 may be configured to generate one or more hierarchically deterministic addresses 906. For example, given a particular private key 118 as a seed value, addresses suitable for use in a blockchain may be generated. For example, each transfer of assets in a blockchain may require a unique address. These hierarchically deterministic addresses 906 may be generated on demand, and subsequently used to generate the signed message data 128.

The secure device 114 may also be configured to receive data from other secure devices 114 or other devices 112, such as via the network 110. For example, the secure device 114 may received signed message data 128 from another secure device 114.

Figure 10:
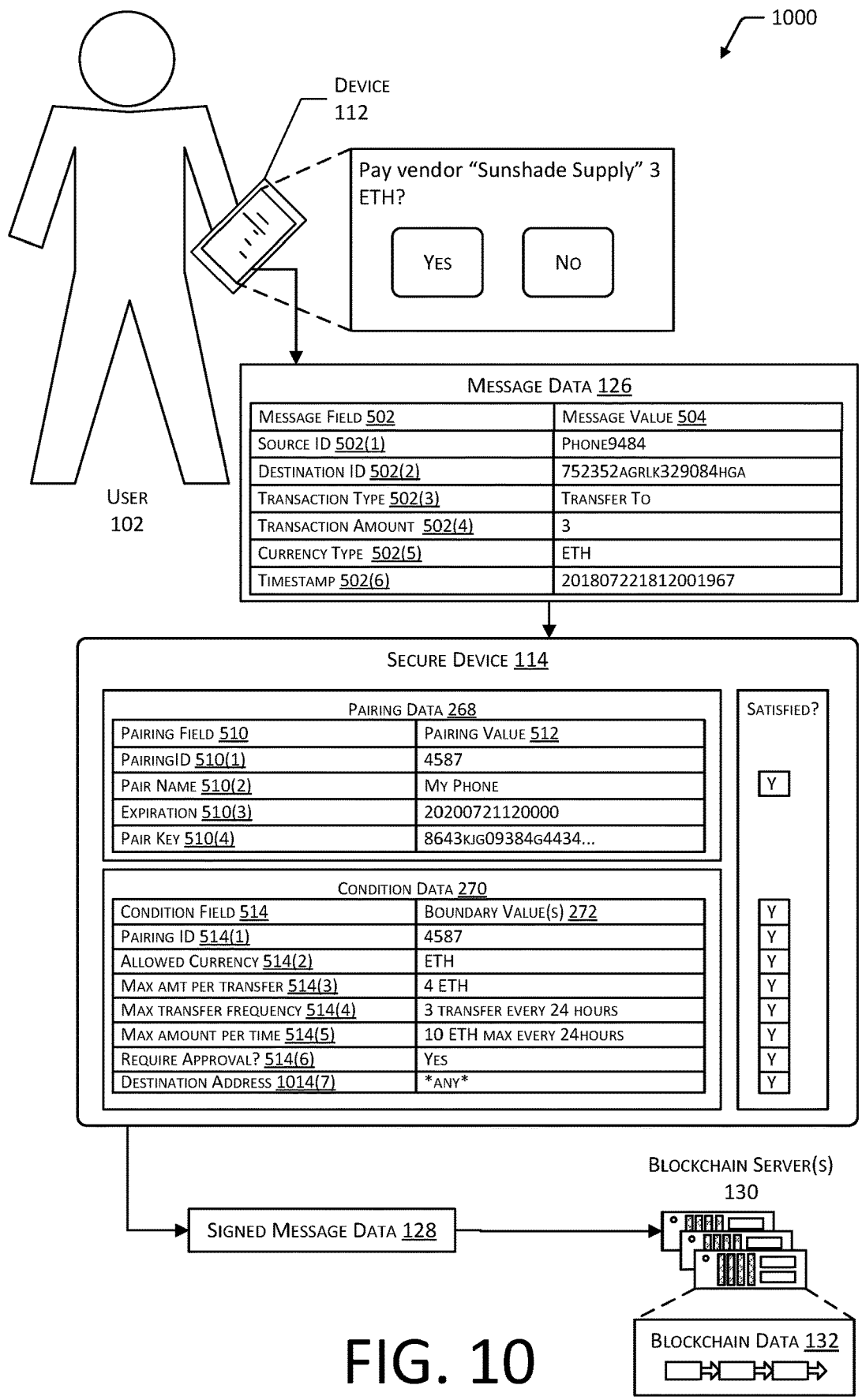
FIG. 10 illustrates a block diagram of the secure device signing a message provided by a paired device, according to one implementation.

FIG. 10 illustrates a block diagram 1000 of the secure device 114 signing a message provided by a paired device 112, according to one implementation. In some situations, a device 112 may be unable or may not be permitted to generate signed message data 128. For example, a user 102 may not wish to store their cryptocurrency private keys 118 on their smartphone. In another example, a resource constrained device, such as a thermostat may lack a secure computing environment, and may be unable to generate signed message data 128 without a substantial risk of compromise.

The secure device 114 may be used to generate signed message data 128 for a previously paired device 112. The device 112, such as a smartphone, tablet, IoT device, and so forth, is paired with the secure device 114. Conditions 516 are specified, such as in the combination of pairing data 268 and associated condition data 270.

The device 112 sends message data 126 to the secure device 114. In the example depicted, the user 102 would like to use their smartphone 112 to pay the vendor "Sunshade Supply" 3 ETH. The message data 126 comprises information associated with this transaction.

The secure device 114 processes the message data 126. If the conditions 516 are deemed to be satisfied, the SCE 116 generates the signed message data 128. As described above, various boundary values 272 may be specified. For example, the user 102 may be required to provide input using the I/O devices 120 of the SCE 116 if the transaction exceeds a threshold amount, has a destination address that is previously unknown, and so forth.

The signed message data 128 may then be sent to the GCE 204. The GCE 204 may then send the signed message data 128 to one or more of the device 112 that originated the message data 126, to the blockchain servers 130, and so forth.

Embodiments may be described in view of the following clauses:

1. A device comprising:
    a general computing environment comprising:
        a network interface;
        a first memory storing computer-executable instructions;
        a first processor in communication with the network interface and the first memory, the first processor executing the computer-executable instructions to:
            establish communication with an external device using the network interface; and
    a secure computing environment comprising:
        an output device;
        an input device;
        a tamper detection device;
        a secure storage memory;
        a second memory storing computer-executable instructions;
        a second processor in communication with the first processor, the touchscreen, the tamper detection device, and the second memory, the second processor executing the computer-executable instructions to:
            receive, from the first processor, a first message comprising one or more values;
            compare one or more values of the first message with one or more previously stored conditions;
            determine the one or more values of the first message satisfy one or more conditions;
            present, using the output device, a user interface requesting approval to sign the first message;
            receive, using the input device, user input;
            determine the user input is valid;
            generate, based at least in part on the one or more values and a private key stored in the secure storage memory, a signed message; and
            send, to the first processor, the signed message.

2. The device of clause 1, the first processor executing the computer-executable instructions to:
    send, using the network interface, the signed message to a blockchain server, wherein the signed message comprises a record for entry into a blockchain.

3. The device of any of clauses 1 or 2, the secure computing environment further comprising:
    a smart card interface in communication with the second processor; and
    the second processor executing the computer-executable instructions to:
        send, to a smart card coupled to the smart card interface, a second message to be signed; and
        receive, from the smart card, a second signed message that has been signed based at least in part on data obtained from a physically unclonable function of the smart card; and
    wherein the signed message includes the second signed message.

4. The device of any of clauses 1 through 3, the second processor executing the computer-executable instructions to:
    determine tampering based at least in part on output from the tamper detection device; and execute one or more instructions to:
        erase contents of the secure storage memory,
        erase at least a portion of the contents of the second memory, or
        disable the second processor.

5. A computer-implemented method comprising:
    receiving, in a secure computing environment of a first device, a request to sign a first message;
    determining, in the secure computing environment of the first device, one or more values of the first message satisfy one or more conditions;
    determining, in the secure computing environment of the first device, one or more private key values; and
    determining, in the secure computing environment of the first device, a first signed message based at least in part on the one or more private key values.

6. The computer-implemented method of clause 5, further comprising:
    determining, in the secure computing environment of the first device, that the first message is associated with a second device that is paired with the first device; and
    wherein the determining the first signed message is further based on the determining the first device is paired with the second device.

7. The computer-implemented method of any of clauses 5 or 6, further comprising:
    receiving, in the secure computing environment of the first device, a pairing request to establish a relationship between the first device and a second device;
    receiving, from an input device in the secure computing environment of the first device, input indicative of approval of the pairing request; and
    determining, within the secure computing environment of the first device, a first key of the first device that is signed within the secure computing environment of the first device;
    sending, from the first device to the second device, the first key;
    receiving, in the secure computing environment of the first device, a second key associated with the second device;
    determining, in the secure computing environment of the first device, that the second key is valid; and
    storing, in the secure computing environment of the first device, data indicative of the pairing between the first device and the second device being authorized.

8. The computer-implemented method of any of clauses 5 through 7, further comprising:

determining, in the secure computing environment of the first device, contact data that is associated with at least a portion of the one or more values, wherein the contact data comprises one or more of:
a name,
a digital signature,
image data,
a telephone number, or
a network address;
presenting, using an output device in the secure computing environment of the first device, at least a portion of the contact data; and
receiving, using an input device in the secure computing environment of the first device, data indicative of approval to sign the first message; and
wherein the determining the first signed message is responsive to the data indicative of approval.

9. The computer-implemented method of any of clauses 5 through 8, further comprising:
receiving, using an input device in the secure computing environment of the first device, data indicative of:
a particular pairing relationship between the first device and a second device; and
one or more boundary values that are indicative of limits of the one or more conditions.

10. The computer-implemented method of any of clauses 5 through 9, further comprising:
determining, in the secure computing environment of the first device, that the first message originated at a second device, and wherein the second device is permitted to provide messages to the first device for signing; and
sending, from the secure computing environment of the first device, the first signed message to a third device.

11. The computer-implemented method of any of clauses 5 through 10, further comprising:
presenting, using an output device in the secure computing environment of the first device, a request for approval to sign the first message; and
receiving, using an input device in the secure computing environment of the first device, data indicative of approval to sign the first message; and
wherein the determining the first signed message is responsive to the data indicative of approval.

12. The computer-implemented method of any of clauses 5 through 11, the method further comprising:
restricting at least a portion of the one or more private keys from transfer outside of the secure computing environment of the first device; and
wherein the first signed message comprises a first key in a plurality of keys that are required to approve a transaction.

13. The computer-implemented method of any of clauses 5 through 12, wherein the first message comprises data associated with a cryptocurrency transaction.

14. The computer-implemented method of any of clauses 5 through 13, wherein the one or more conditions have one or more limits described by one or more boundary values, and further wherein individual ones of the one or more boundary values are indicative of one or more of:
a type of asset,
a type of transaction,
a maximum number of signed messages within a specified interval of time,
a maximum quantity of assets in a single transaction,
a minimum quantity of assets in a single transaction, or
a maximum quantity of assets transferred per interval of time.

15. The computer-implemented method of any of clauses 5 through 14, further comprising:
determining the first message is associated with a second device that is paired with the first device; and
wherein the one or more conditions have one or more limits that are based at least in part on the second device.

16. A method executing in a secure computing environment of a first device, the method comprising:
receiving a first message;
determining the first message is associated with a second device;
determining the first device is paired with the second device;
determining one or more values of the first message satisfy one or more conditions;
determining a private key value; and
determining a first signed message based at least in part on the private key value.

17. The method of clause 16, further comprising:
determining, based on at least a portion of the one or more values, contact data;
presenting, using an output device in the secure computing environment, at least a portion of the contact data; and
receiving, using an input device in the secure computing environment, data indicative of approval to sign the first message; and
wherein the determining the first signed message is responsive to the data indicative of approval.

18. The method of any of clauses 16 or 17, further comprising:
receiving, using an input device in the secure computing environment, data indicative of:
selection of pairing with the second device; and
one or more boundary values that are indicative of limits of the one or more conditions.

19. The method of any of clauses 16 through 18, the method further comprising:
maintaining the private key within the secure computing environment; and
wherein the first signed message comprises one signature of a plurality of signatures that are required to approve a transaction.

20. The method of any of clauses 16 through 19, wherein the one or more conditions have one or more values that are indicative of limits, wherein the one or more conditions are associated with the second device.

The processes discussed herein may be implemented in hardware, software, or a combination thereof. In the context of software, the described operations represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain modules, devices, software programs, processes, or entities, this need not be the case, and a variety of alternative implementations will be understood by those having ordinary skill in the art. For example, the functionality provided by one module may be incorporated into another.

Additionally, those having ordinary skill in the art will readily recognize that the system and techniques described above can be utilized in a variety of devices, environments, and situations.

Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A first device comprising:
   a general computing environment comprising:
      a network interface;
      a first memory storing first computer-executable instructions; and
      a first processor in communication with the network interface and the first memory, the first processor executing the first computer-executable instructions to:
         establish communication with an external device using the network interface; and
   a secure computing environment comprising:
      an output device;
      an input device;
      a tamper detection device;
      a secure storage memory;
      a second memory storing second computer-executable instructions; and
      a second processor in communication with the first processor, the input device, the tamper detection device, and the second memory, the second processor executing the second computer-executable instructions to:
         receive, from the first processor, a pairing request to establish a relationship between the first device and a second device;
         determine approval of the pairing request;
         receive, from the first processor, a first message comprising one or more values;
         compare the one or more values of the first message with one or more boundary values that are indicative of limits of one or more previously stored conditions;
         determine the one or more values of the first message satisfy the one or more boundary values that are indicative of the limits of the one or more previously stored conditions;
         determine a first key of the first device that is signed within the secure computing environment of the first device;
         send, from the first device to the second device, the first key;
         receive, in the secure computing environment of the first device, a second key associated with the second device;
         determine, in the secure computing environment of the first device, that the second key is valid;
         send data indicative of requesting approval to sign the first message;
         receive, from the second device, user input;
         determine the user input is valid;
         generate, based at least in part on the one or more values and the second key, a signed message; and
         send, to the first processor, the signed message.

2. The first device of claim 1, the first processor further executing the first computer-executable instructions to:
   send, using the network interface, the signed message to a blockchain server, wherein the signed message comprises a record for entry into a blockchain.

3. The first device of claim 1, the secure computing environment further comprising:
   a smart card interface in communication with the second processor; and
   the second processor executing the second computer-executable instructions to:
      send, to a smart card coupled to the smart card interface, a second message to be signed; and
   receive, from the smart card, a second signed message that has been signed based at least in part on data obtained from a physically unclonable function of the smart card; and
   wherein the signed message includes the second signed message.

4. The first device of claim 1, the second processor further executing the second computer-executable instructions to:
   determine tampering based at least in part on output from the tamper detection device; and execute one or more instructions to:
      erase contents of the secure storage memory,
      erase at least a portion of the contents of the second memory, or
      disable the second processor.

5. A computer-implemented method comprising:
   receiving, in a secure computing environment of a first device, a request to sign a first message;

determining, in the secure computing environment of the first device, one or more values of the first message satisfy one or more conditions;

determining, in the secure computing environment of the first device, one or more private key values;

determining, in the secure computing environment of the first device, contact data that is associated with at least a portion of the one or more values;

presenting, using an output device in communication with the secure computing environment of the first device, at least a portion of the contact data;

receiving, using an input device in communication with the secure computing environment of the first device, data indicative of:
  approval to sign the first message;
  a particular pairing relationship between the first device and a second device; and
  one or more boundary values that are indicative of one or more limits of the one or more conditions; and determining, in the secure computing environment of the first device, a first signed message based at least in part on the one or more private key values.

6. The computer-implemented method of claim 5, further comprising:
  determining, in the secure computing environment of the first device, that the first message is associated with the second device that is paired with the first device; and
  wherein the determining the first signed message is further based on the determining the first device is paired with the second device.

7. The computer-implemented method of claim 5, further comprising:
  receiving, from the input device in communication with the secure computing environment of the first device, input indicative of approval of a pairing request;
  determining, within the secure computing environment of the first device, a first key of the first device that is signed within the secure computing environment of the first device;
  sending, from the first device to the second device, the first key;
  receiving, in the secure computing environment of the first device, a second key associated with the second device;
  determining, in the secure computing environment of the first device, that the second key is valid; and
  storing, in the secure computing environment of the first device, data indicative of a pairing between the first device and the second device being authorized.

8. The computer-implemented method of claim 5, wherein:
  the contact data comprises one or more of:
    a name,
    a digital signature,
    image data,
    a telephone number, or
    a network address; and
  the determining the first signed message is responsive to the data indicative of the approval to sign the first message.

9. The computer-implemented method of claim 5, further comprising:
  determining, in the secure computing environment of the first device, that the first message originated at the second device, and wherein the second device is permitted to provide messages to the first device for signing; and sending, from the secure computing environment of the first device, the first signed message to a third device.

10. The computer-implemented method of claim 5, further comprising:
  presenting, using the output device in communication with the secure computing environment of the first device, a request for approval to sign the first message; and
  receiving, using the input device in communication with the secure computing environment of the first device, the data indicative of the approval to sign the first message; and
  wherein the determining the first signed message is responsive to the received data indicative of the approval.

11. The computer-implemented method of claim 5, the method further comprising:
  restricting at least a portion of the one or more private key values from transfer outside of the secure computing environment of the first device.

12. The computer-implemented method of claim 5, wherein the first message comprises data associated with a cryptocurrency transaction.

13. The computer-implemented method of claim 5, wherein individual ones of the one or more boundary values are indicative of one or more of:
  a type of asset,
  a type of transaction,
  a maximum number of signed messages within a specified interval of time,
  a maximum quantity of assets in a single transaction,
  a minimum quantity of assets in a single transaction, or
  a maximum quantity of assets transferred per interval of time.

14. The computer-implemented method of claim 5, further comprising:
  determining the first message is associated with the second device that is paired with the first device; and
  wherein the one or more conditions having the one or more limits are based at least in part on the second device.

15. A method comprising:
  receiving, in a secure computing environment of a first device, a first message;
  determining, in the secure computing environment of the first device, the first message is associated with a second device;
  determining, in the secure computing environment of the first device, that the first device is paired with the second device;
  determining, in the secure computing environment of the first device, one or more values of the first message satisfy one or more conditions;
  determining, in the secure computing environment of the first device, a private key value;
  determining, in the secure computing environment of the first device, based on at least a portion of the one or more values, contact data;
  presenting, using an output device in communication with the secure computing environment of the first device, at least a portion of the contact data;
  receiving, using an input device in communication with the secure computing environment of the first device, data indicative of:
    approval to sign the first message;
    selection of pairing with the second device; and one or more boundary values that are indicative of limits of the one or more conditions; and determining, in the secure computing environment of the first device, a first signed message based at least in part on the private key value.

16. The method of claim 15, the method further comprising:

maintaining the private key value within the secure computing environment of the first device.

17. The method of claim 15, wherein the one or more conditions are associated with the second device.

18. The method of claim 15, further comprising:

determining a second message that is to be transferred between a general computing environment and the secure computing environment, wherein the second message is indicative of one or more of:

frequency of a data transfer, size of the data transfer, type of data being transferred, or data indicative of a set of instructions; and based on the type of data being transferred, restricting communication between the general computing environment and the secure computing environment, wherein the restricting of the communication comprises one or more of:

erasing the second message, suspending communication between the general computing environment and the secure computing environment, erasing contents of a secure storage memory in the secure computing environment, or rendering one or more components of the secure computing environment inoperable.

19. The method of claim 15, wherein individual ones of the one or more boundary values are indicative of one or more of:

a type of asset, a type of transaction, a maximum number of signed messages within a specified interval of time, a maximum quantity of assets in a single transaction, a minimum quantity of assets in a single transaction, or a maximum quantity of assets transferred per interval of time.

20. The method of claim 15, further comprising:

restricting at least a portion of one or more private key values from transfer outside of the secure computing environment of the first device.

* * * * *

UNITED STATES PATENT AND TRADEMARK OFFICE
CERTIFICATE OF CORRECTION

PATENT NO. : 11,233,644 B2  Page 1 of 1
APPLICATION NO. : 16/057290
DATED : January 25, 2022
INVENTOR(S) : Kreder, III et al.

It is certified that error appears in the above-identified patent and that said Letters Patent is hereby corrected as shown below:

In the Claims

Column 28, Claim 5, Line 65:
Currently reads: "mes sage"
Where it should read: --message--

Signed and Sealed this
First Day of March, 2022

Drew Hirshfeld
*Performing the Functions and Duties of the*
*Under Secretary of Commerce for Intellectual Property and*
*Director of the United States Patent and Trademark Office*